US008908011B2

(12) United States Patent
Yamada et al.

(10) Patent No.: US 8,908,011 B2
(45) Date of Patent: Dec. 9, 2014

(54) THREE-DIMENSIONAL VIDEO CREATING DEVICE AND THREE-DIMENSIONAL VIDEO CREATING METHOD

(75) Inventors: Hitoshi Yamada, Osaka (JP); Bo Li, Singapore (SG); Chin Phek Ong, Singapore (SG); Sheng Mei Shen, Singapore (SG)

(73) Assignee: Panasonic Corporation, Osaka (JP)

( * ) Notice: Subject to any disclaimer, the term of this patent is extended or adjusted under 35 U.S.C. 154(b) by 429 days.

(21) Appl. No.: 13/509,809

(22) PCT Filed: Sep. 16, 2011

(86) PCT No.: PCT/JP2011/005250
§ 371 (c)(1),
(2), (4) Date: May 15, 2012

(87) PCT Pub. No.: WO2012/035783
PCT Pub. Date: Mar. 22, 2012

(65) Prior Publication Data
US 2012/0229609 A1 Sep. 13, 2012

(30) Foreign Application Priority Data
Sep. 17, 2010 (JP) .................................. 2012-210138

(51) Int. Cl.
H04N 13/02 (2006.01)
G06T 7/00 (2006.01)
(52) U.S. Cl.
CPC .......... *H04N 13/0264* (2013.01); *G06T 7/0071* (2013.01); *G06T 2207/10016* (2013.01)
USPC .................... 348/46; 348/42; 348/43; 348/54
(58) Field of Classification Search
None
See application file for complete search history.

(56) References Cited

U.S. PATENT DOCUMENTS 5,682,437 A 10/1997 Okino et al.
7,113,632 B2 9/2006 Lee et al.
(Continued)

FOREIGN PATENT DOCUMENTS

JP 2002-324234 11/2002
JP 2007-316982 12/2007
(Continued)

OTHER PUBLICATIONS

Extended European Search Report issued Apr. 10, 2014 in corresponding European patent application No. 11824796.4.
P.H.S. Torr et al., "Feature Based Methods for Structure and Motion Estimation", in: "Vision Algorithms: Theory and Practice"; Jan. 1, 2000, Springer Berlin Heidelberg, Berlin, Heidelberg, XP055109876, vol. 1883, pp. 278-294.
(Continued)

*Primary Examiner* — Gims Philippe
*Assistant Examiner* — Samuel D Fereja
(74) *Attorney, Agent, or Firm* — Wenderoth, Lind & Ponack, LLP.

(57) ABSTRACT

A three-dimensional video creating device (100) includes: a selection unit (123) which selects, from among frames constituting the 2D video, frames each of which has a common area whose proportion to the frame is greater than or equal to a predetermined value, as candidate three-dimensional partner frames that are candidate frames each constituting a three-dimensional image together with a target frame included in the frames constituting the 2D video; a determination unit (124) which determines, from among the candidate three-dimensional partner frames, a three-dimensional partner frame, based on the first criteria; and a three-dimensional pair creation unit (125) which creates a three-dimensional pair constituting the three-dimensional image corresponding to the target frame, using the target frame and the three-dimensional partner frame.

16 Claims, 16 Drawing Sheets

(56) References Cited

U.S. PATENT DOCUMENTS

| | | |
|---|---|---|
| 2003/0156751 A1 | 8/2003 | Lee et al. |
| 2006/0092272 A1 | 5/2006 | Wolowelsky et al. |
| 2008/0150945 A1 | 6/2008 | Wang et al. |
| 2008/0278569 A1 | 11/2008 | Rotem et al. |
| 2010/0118156 A1 | 5/2010 | Saito |
| 2010/0309286 A1* | 12/2010 | Chen et al. .................. 348/43 |
| 2011/0285814 A1* | 11/2011 | Hsiao ........................... 348/43 |

FOREIGN PATENT DOCUMENTS

| | | |
|---|---|---|
| JP | 2010-515303 | 5/2010 |
| WO | 2008/080156 | 7/2008 |
| WO | 2010/024479 | 3/2010 |

OTHER PUBLICATIONS

International Search Report issued Dec. 13, 2011 in International (PCT) Application No. PCT/JP2011/005250.

Guofeng Zhang et al., "Stereoscopic Video Synthesis from a Monocular Video", IEEE Transactions on Visualization and Computer Graphics, vol. 13, No. 4, Jul./Aug. 2007, pp. 686-696.

Bruce D. Lucas et al., "An Iterative Image Registration Technique with an Application to Stereo Vision", International Joint Conference on Artificial Intelligence, Aug. 1981.

C. Harris et al., "A combined corner and edge detector", Alvey Vision Conference, Aug. 1988.

R. Hartley et al., "Multiple View Geometry in Computer Vision", Cambridge University Press, Oct. 2000.

* cited by examiner

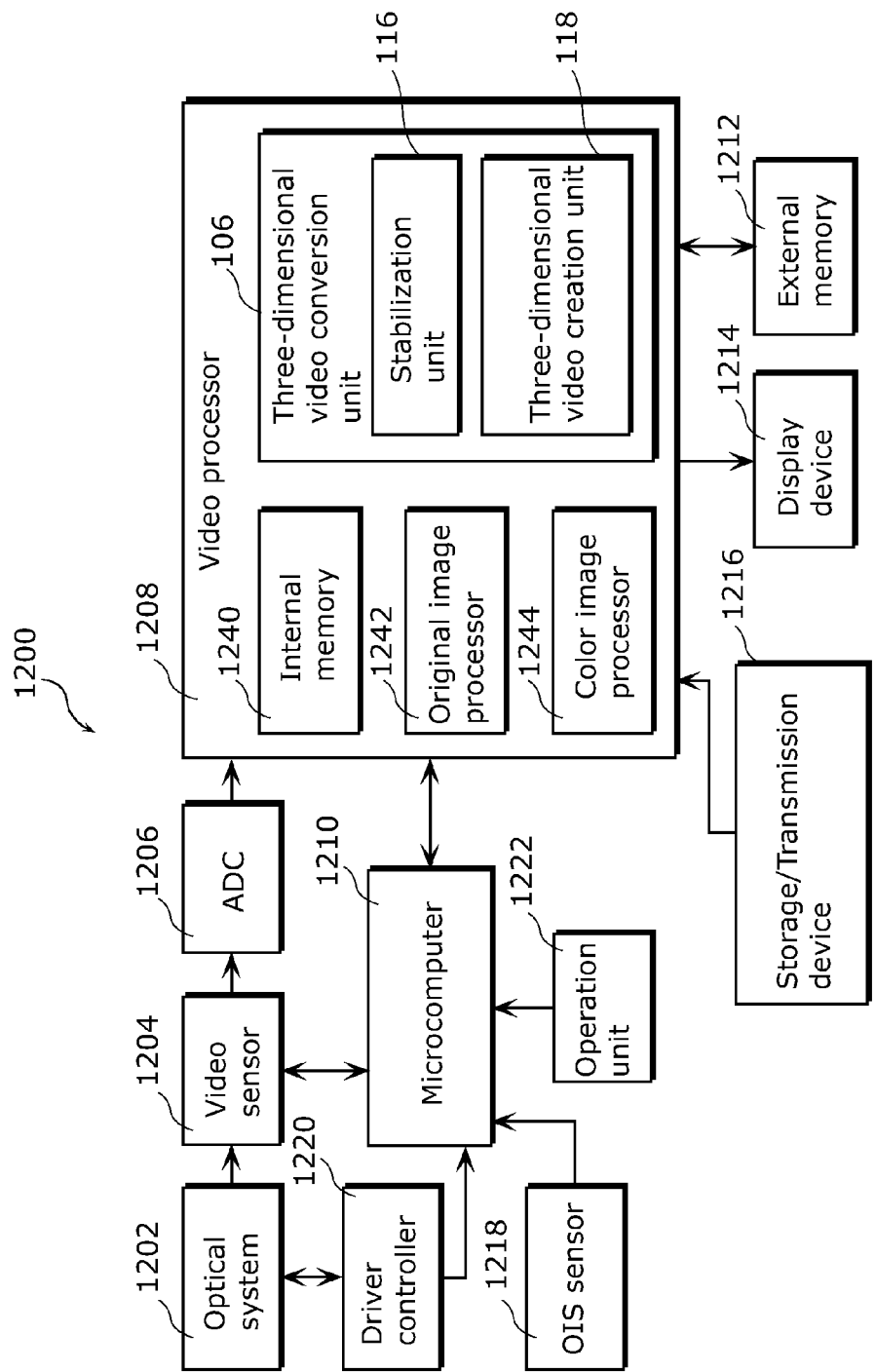

THREE-DIMENSIONAL VIDEO CREATING DEVICE AND THREE-DIMENSIONAL VIDEO CREATING METHOD

TECHNICAL FIELD

The present invention relates to three-dimensional video creating devices and three-dimensional video creating methods, and particularly to a three-dimensional video creating device and a three-dimensional video creating method which create a three-dimensional (3D) video from a two-dimensional (2D) video.

BACKGROUND ART

Techniques associated with 3D (three dimensions) are receiving attention. The techniques associated with 3D have wide applications ranging from military navigation, industrial inspection, to consumer electronics. In recent years, applications and products to which 3D techniques are applied have become available in the market. For instance, 3D televisions are sold by many television manufacturers and 3D movies are shown at various 3D movie theaters. In addition, some television broadcasting companies are broadcasting 3D channels on a trial basis. As stated above, the application of the techniques associated with 3D has increased opportunities for people to experience 3D such as viewing a three-dimensional (3D) video.

Moreover, research on three-dimensional images was started for the techniques associated with 3D in the year 1838. People can perceive a sense of depth due to the parallax between the right eye and the left eye. Accordingly, when a right-eye image and a left-eye image that have an appropriate parallax for the people were generated and the generated right-eye image and the generated left-eye image were respectively sent to the right eye and the left eye of the people, the people would be able to enjoy a realistic three-dimensional (3D) image.

For this reason, various techniques have been developed so as to provide 3D experience suitable for the people. Examples of the developed techniques include 3D image capturing techniques, 3D video capturing techniques, post-processing techniques, and techniques for achieving various functions in a series of 3D processes including, packaging (3D content), 3D content distribution, and 3D display.

Although the 3D televisions have recently made remarkable progress, available 3D contents for home users to enjoy are in short supply. This situation can be mitigated using two solutions.

The first solution is intended to further develop new 3D cameras and market many such 3D cameras. Unfortunately, it takes much time to carry out the first solution. Moreover, the users have to share a burden such as purchasing a new 3D camera.

The second solution is intended to convert 2D video contents into 3D video contents. For instance, examples of this method include a method of converting current 2D video contents into 3D video contents and a method of capturing, with a normal camera or a camcorder, a 2D video and converting 2D video contents into 3D video contents at the same time. The method is more favorable than the development of the new 3D cameras or the like in that the method makes it possible to provide the people with suitable 3D experience without any cost.

PTL 1 discloses a technique of adapting to complexity (low calculation cost) and automatically converting a 2D image (2D video) into a 3D image (3D video). In the technique disclosed by PTL 1, a frame is first classified into a flat image and a non-flat image. Then, the flat image is directly converted into a three-dimensional (3D) display format, and the non-flat image is converted based on a pre-estimated depth map. It is to be noted that the stereo conversion based on the depth map is adaptable to more types of images.

PTL 2 discloses a technique of converting a 2D image signal into a 3D image signal and outputting the converted 3D image signal. In the technique disclosed by PTL 2, the motion of each of frames is first analyzed, and the frames are classified into three types. Specifically, the frames are classified into the following three types: (i) a frame having a horizontal motion and no scene change; (ii) a frame having no horizontal motion and no scene change; and (iii) a frame having no horizontal motion. Next, when frames have the horizontal motion and no scene change, a three-dimensional pair is formed directly using a target frame and the next frame.

NPL 1 discloses a three-dimensional conversion method based on SFM (structure from motion). In the method disclosed by NPL 1, camera parameters such as a position, rotation, and a focal length are estimated using SFM algorithm. Next, a candidate left-eye image and a corresponding right-eye image are selected from an original video sequence based on the estimated camera parameters.

CITATION LIST

Patent Literature

[PLT 1]
U.S. Patent Application Publication No. 2008/0150945
[PLT 2]
International Publication WO 2010/024479

Non Patent Literature

[NPL 1]
Zhang, Guofeng, Wei Hua, Xueying Qin, Tien-Tsin Wong, and Hujun Bao. "Stereoscopic Video Synthesis from a Monocular Video". IEEE Transactions on Visualization and Computer Graphics, 13(4): 686-696 (2007).
[NPL 2]
Lucas, Bruce D. and Takeo Kanade. "An Iterative Image Registration Technique with an Application to Stereo Vision (1981)" in "International Joint Conference on Artificial Intelligence".
[NPL 3]
Harris, C. and M. Stephens. "A combined corner and edge detector (1988)" in "Alvey vision conference".
[NPL 4]
Hartley, R. and A. Zisserman. *Multiple View Geometry in Computer Vision*. London: Cambridge University Press, 2000.

SUMMARY OF INVENTION

Technical Problem

However, the conventional techniques cause the following problems.

First, in the technique disclosed by PTL 1, it is not possible to estimate a high-quality depth map in real time due to excessively complex calculation. Moreover, when a 2D image (2D video) is converted into a 3D image (3D video) based on a low-quality depth map, a requirement of converting into a 3D image with which people feel comfortable is not satisfied.

Next, the technique disclosed by PTL 2 falls short of a requirement for comfortable 3D. Specifically, frames having the only horizontal motion do not often occur in an actual video. For this reason, in the technique disclosed by PTL 2, the 2D video is often converted into the 3D video based on an estimated depth map. The estimation of the depth map is easily influenced by noise, because the estimation is made based on a horizontal boundary. In addition, it takes time to estimate the high-quality depth map.

Lastly, in the technique disclosed by NPL 1, the performance of three-dimensional conversion depends on the accuracy of the SFM. Highly accurate SFM is a time-consuming process and is difficult to apply in real time. Moreover, although using offline SFM for online conversion is disclosed, its feasibility is low.

The present invention has been conceived in view of the above problems, and an object of the present invention is to provide a three-dimensional video creating device and a three-dimensional video creating method which create an appropriate and comfortable 3D video from a 2D video.

Solution to Problem

In order to achieve the above object, a three-dimensional video creating device according to an aspect of the present invention is a three-dimensional video creating device which creates a three-dimensional (3D) video from a two-dimensional (2D) video, and includes: a receiving unit which receives a 2D video; a selection unit which selects, from among frames constituting the 2D video, frames each of which has a common area whose proportion to the frame is greater than or equal to a predetermined value, as candidate three-dimensional partner frames that are candidate frames each constituting a three-dimensional image together with a target frame included in the frames constituting the 2D video; a determination unit which determines, from among the candidate three-dimensional partner frames, a three-dimensional partner frame that is a frame which, together with the target frame, constitutes a three-dimensional image, based on predetermined criteria; a three-dimensional pair creation unit which creates a three-dimensional pair constituting the three-dimensional image corresponding to the target frame, using the target frame and the three-dimensional partner frame; and a conversion unit which generates, from the target frame and the candidate three-dimensional partner frames, a transformation matrix, and converts the three-dimensional pair by applying the generated transformation matrix to the three-dimensional pair.

With this configuration, it is possible to create the three-dimensional video without estimation using SFM having high calculation costs. Moreover, the three-dimensional video creating device creates the three-dimensional video without time-consuming depth map estimation.

As a result, the present invention achieves the three-dimensional video creating device which creates the appropriate and comfortable 3D video from the 2D video.

It is to be noted that the present invention can be achieved not only as the device but also as an integrated circuit including the processing units of the device, a method including, as steps, the processing units of the device, and a program causing a computer to execute the steps. Moreover, the program may be distributed via a recording medium such as a CD-ROM and a communication medium such as the Internet.

Advantageous Effects of Invention

The present invention achieves the three-dimensional video creating device and the three-dimensional video creating method which create the appropriate and comfortable 3D video from the 2D video.

BRIEF DESCRIPTION OF DRAWINGS

FIG. 17 is a block diagram showing a configuration of an imaging device according to Embodiment 3 of the present invention.

DESCRIPTION OF EMBODIMENTS

The following describes embodiments of the present invention with reference to the drawings.

Embodiment 1

Figure 1:
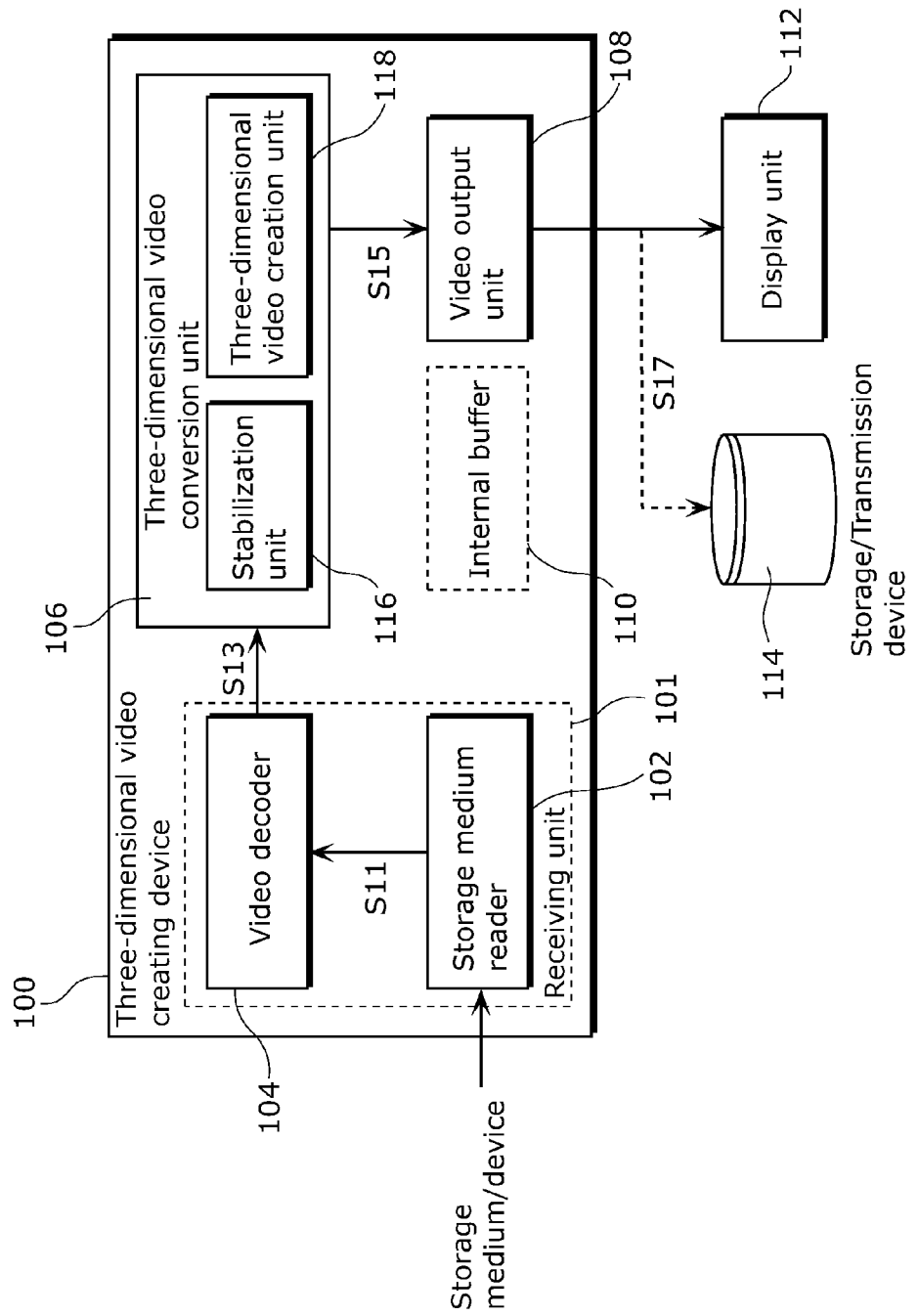
FIG. 1 is a block diagram showing a configuration of a three-dimensional video creating device according to Embodiment 1 of the present invention.
Figure 2:
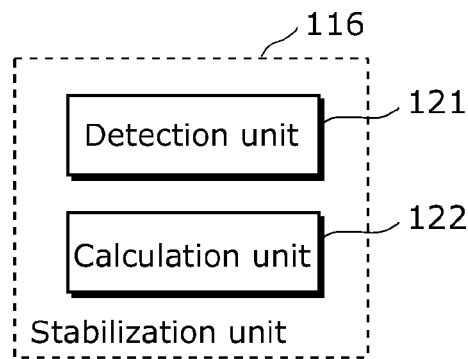
FIG. 2 is a block diagram showing a detailed configuration of a stabilization unit according to Embodiment 1 of the present invention.
Figure 3:
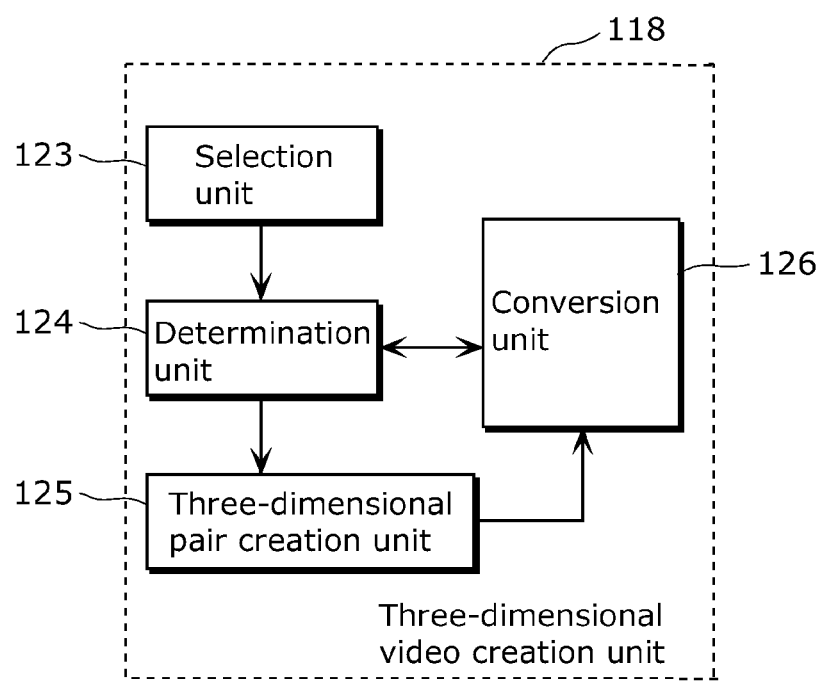
FIG. 3 is a block diagram showing a detailed configuration of a three-dimensional video creation unit according to Embodiment 1 of the present invention.

FIG. 1 is a block diagram showing a configuration of a three-dimensional video creating device according to Embodiment 1 of the present invention. FIG. 2 is a block diagram showing a detailed configuration of a stabilization unit according to Embodiment 1 of the present invention. FIG. 3 is a block diagram showing a detailed configuration of a three-dimensional video creation unit according to Embodiment 1 of the present invention.

A three-dimensional video creating device 100 shown in FIG. 1 creates a three-dimensional (3D) video from a two-dimensional (2D) video, and outputs the created 3D video. The outputted 3D video is displayed by a display unit 112 outside of the three-dimensional video creating device 100 or stored into a storage/transmission device 114 outside of the three-dimensional video creating device 100. The three-dimensional video creating device 100 includes a receiving unit 101, a three-dimensional video conversion unit 106, a video output unit 108, and an internal buffer 110.

The receiving unit 101 receives the 2D video. The receiving unit 101 includes, for example, a storage medium reader 102 and a video decoder 104, as shown in FIG. 1. The storage medium reader 102 accumulates a plurality of frames (image data) constituting the 2D video. The video decoder 104 obtains image data S11 from the storage medium reader 102, and outputs the image data S11 to the three-dimensional video conversion unit 106. When the image data S11 is coded, the video decoder 104 outputs, to the three-dimensional video conversion unit 106, 2D video data S13 obtained by decoding the image data S11 as necessary.

The three-dimensional video conversion unit 106 includes a stabilization unit 116 and a three-dimensional video creation unit 118. The three-dimensional video conversion unit 106 stabilizes the 2D video data S13 using the stabilization unit 116 and the three-dimensional video creation unit 118, and subsequently converts the stabilized 2D video data S13 into a three-dimensional (3D) video.

The stabilization unit 116 corrects a fluctuation between one of the frames constituting the 2D video (2D video data S13) and another one of the frames, to stabilize the frames. Here, the fluctuation between the one frame and the other frame is, for instance, jitter in a video caused by camera shake during the capturing of a 2D video. Moreover, to stabilize means, for example, to remove the fluctuation from a video.

As shown in FIG. 2, the stabilization unit 116 includes a detection unit 121 and a calculation unit 122. The stabilization unit 116 corrects the fluctuation between one of the frames and another one of the frames by using a projective transformation matrix calculated based on feature points which are corresponding feature points among feature points on a predetermined frame and feature points on each of adjacent frames temporally close to the predetermined frame.

Specifically, the detection unit 121 detects the feature points which are the corresponding feature points among the feature points on the predetermined frame and the feature points on the adjacent frame temporally close to the predetermined frame.

The calculation unit 122 calculates, as a stabilization matrix, the projective transformation matrix for warping (transforming) the predetermined frame so that the feature points on the predetermined frame and weighted feature points on a corresponding adjacent frame have the same coordinate value. For instance, the calculation unit 122 calculates the weights of the adjacent frames using a weight function. When a corresponding adjacent frame is temporally closest to the predetermined frame, the calculation unit 122 calculates a weighted value closer to 1 using the weight function. In contrast, when the corresponding adjacent frame is temporally far from the predetermined frame, the calculation unit 122 calculates a weighted value smaller than 1 using the weight function.

As stated, the stabilization unit 116 applies the calculated projective transformation matrix to the predetermined frame and performs the same processing on all the frames, to stabilize the frames constituting the 2D video data.

As shown in FIG. 3, the three-dimensional video creation unit 118 includes a selection unit 123, a determination unit 124, a three-dimensional pair creation unit 125, and a conversion unit 126. The three-dimensional video creation unit 118 creates the 3D video from the stabilized 2D video data S13.

The selection unit 123 selects, from among the frames constituting the 2D video, frames each of which has a common area whose proportion to the frame is greater than or equal to a predetermined value, as candidate three-dimensional partner frames that are candidate frames each constituting a three-dimensional image together with a target frame. Here, each common area is an area of an image common to the target frame.

For example, the selection unit 123 selects, from among the frames constituting the 2D video, frames captured for the same scene as the target frame, as the candidate three-dimensional partner frames. Specifically, when each of the proportion of a common area to the target frame and the proportion of a common area to each of the candidate three-dimensional partner frames is greater than or equal to the predetermined value (e.g. 0.9), the selection unit 123 judges that the candidate three-dimensional partner frames are the frames captured for the same scene as the target frame. Here, the common areas are each calculated based on feature points which are corresponding feature points on frame between the target frame and each candidate three-dimensional partner frame. Moreover, for instance, the selection unit 123 may select, from among the frames constituting the 2D video, adjacent frames temporally close to the target frame, as the candidate three-dimensional partner frames.

The determination unit 124 determines, from among the candidate three-dimensional partner frames, a three-dimensional partner frame that is a frame which, together with the target frame, constitutes a three-dimensional image, based on the first criteria. That is to say, the determination unit 124 determines the three-dimensional partner frame by judging whether or not the first criteria are satisfied using feature points on a frame that can be detected by performing image processing.

The three-dimensional pair creation unit 125 creates, using the target frame and the three-dimensional partner frame, a three-dimensional pair constituting a three-dimensional image corresponding to the target frame.

It is to be noted that the first criteria are criteria including a vertical difference criterion, a horizontal parallax criterion, a smoothing criterion, and a distortion reduction criterion. Specifically, the vertical difference criterion specifies that a three-dimensional partner frame is a frame whose difference in vertical position between the common area of the target frame and the common area of the three-dimensional partner frame is substantially zero. The horizontal parallax criterion specifies that the three-dimensional partner frame is a frame whose difference in horizontal position (parallax) between the common area of the target frame and the common area of the three-dimensional partner frame is within a predetermined range. The smoothing criterion specifies that the three-dimensional partner frame is a frame for which the displacement of a common area is smoothed between temporally successive three-dimensional pairs. The distortion reduction criterion specifies that the three-dimensional partner frame is a frame which has a common area whose proportion to the frame is greater than or equal to a predetermined value, like the target frame.

The conversion unit 126 generates, from the target frame and the candidate three-dimensional partner frames selected by the selection unit 123, a transformation matrix for warping a candidate three-dimensional partner frame, and converts the created three-dimensional pair by applying the generated transformation matrix to the three-dimensional pair.

Here, the conversion unit 126 generates the transformation matrix based on the feature points which are the corresponding feature points among the feature points on the target frame and the feature points on each of the candidate three-dimensional partner frames. Specifically, the conversion unit 126 generates the transformation matrix by combining a projective transformation matrix, a skew transformation matrix, and a translation transformation matrix that are calculated. More specifically, the conversion unit 126 first calculates a fundamental matrix using the target frame and the candidate three-dimensional partner frames. Next, the conversion unit 126 calculates, based on the fundamental matrix, a projective transformation matrix so that a vertical difference between the target frame and the three-dimensional partner frame in the three-dimensional pair is minimized. Next, the conversion unit 126 calculates a skew transformation matrix so that a common area in the three-dimensional partner frame converted using the projective transformation matrix maintains the same orthogonality and the same aspect ratio as the common area before the conversion. Next, the conversion unit 126 calculates a translation transformation matrix so that a parallax between the target frame and a three-dimensional partner frame to which the projective transformation matrix and the skew transformation matrix are applied becomes the same as a parallax between a target frame prior to the target frame and a three-dimensional partner frame.

The internal buffer 110 corresponds to a storage unit according to an implementation of the present invention, and stores the three-dimensional pair converted by the conversion unit 126. Specifically, the internal buffer 110 stores the three-dimensional pair created by the three-dimensional video creation unit 118, as intermediate data that is data yet to be outputted to the video output unit 108. That is to say, the three-dimensional video conversion unit 106 transmits created three-dimensional pair data S15 to the video output unit 108 through the internal buffer 110.

The video output unit 108 corresponds to an output unit according to an implementation of the present invention, and outputs the converted three-dimensional pair that is stored in the internal buffer 110. The video output unit 108 also outputs a three-dimensional pair which corresponds to each of frames constituting a 2D video and is converted by the conversion unit 126.

Moreover, the video output unit 108 adjusts the received three-dimensional pair data S15 to an output video format (three-dimensional pair data S17) compliant with a favorable output format, and outputs the adjusted data to the display unit 112. Specifically, the video output unit 108 adjusts the output video format to a display format of the display unit 112 so that the display unit 112 displays the data. For instance, although examples of the output video format include a format for an autostereoscopic device which requires no glasses for viewing, the output video format is not limited to such a format. For examples, the output video format may be gray/color anaglyph or an interlace format. Moreover, the output video format may be a checkerboard format or another format for a frame sequential three-dimensional display device which requires active shutter glasses for viewing.

It is to be noted that the video output unit 108 may store/transmit the three-dimensional pair data S17 using the storage/transmission device 114.

The storage/transmission device 114 may be but is not limited to, for instance, a flash-based memory card, a hard drive, or an optical drive. Moreover, the storage/transmission device 114 may be but is not limited to, for instance, an HDMI interface, a USB interface, a Wireless interface, or a direct-to-printer interface. It is to be noted that the storage/transmission device 114 may arbitrarily perform lossless compression or lossy compression on data, and store/transmit the data.

The three-dimensional video creating device 100 is thus configured.

It is to be noted that although the three-dimensional video creating device 100 (or the three-dimensional video conversion unit 106 or the like included in the three-dimensional video creating device 100) is typically achieved in the form of an IC (integrated circuit), an ASIC (application-specific integrated circuit), or an LSI (large scale integrated circuit), the three-dimensional video creating device 100 may be configured of a plurality of chips or a single chip. It is to be noted that each of the three-dimensional video creating device 100, the three-dimensional video conversion unit 106, and the like is not limited to be achieved in the form of the LSI. Each of the three-dimensional video creating device 100, the three-dimensional video conversion unit 106, and the like may be achieved in the form of the IC, a system LSI, a super LSI, or an ultra LSI depending on the degree of integration.

Moreover, the three-dimensional video creating device 100 or the like may be integrated using a special circuit or a general-purpose processor. Examples of the special circuit include a specialized microprocessor such as a DSP (digital signal processor) controllable by a program instruction. Furthermore, FPGA (Field Programmable Gate Array) that can be programmed after manufacturing LSIs or a reconfigurable processor that allows re-configuration of the connection or configuration of an LSI may be used for the three-dimensional video creating device 100 or the like. In the future, when, with advancement in manufacturing and processing technologies, a brand-new technology may replace LSI, the three-dimensional video creating device 100 or the like may be integrated using such a technology.

Moreover, the three-dimensional video creating device 100 may be implemented in a liquid crystal display device which displays images (videos) in chronological order, a plasma display device, a display device to which a lenticular lens layer is added, or a display device capable of displaying a three-dimensional image of a display device of a different type or the like.

Furthermore, the three-dimensional video creating device 100 may be implemented in a digital media player apparatus such as a digital video disc player, a blu-ray disc player, and a digital media player of a different type. The three-dimensional video creating device 100 may be implemented in an apparatus of a different type. Any of the above cases does not limit the scope of the present invention.

Figure 4:
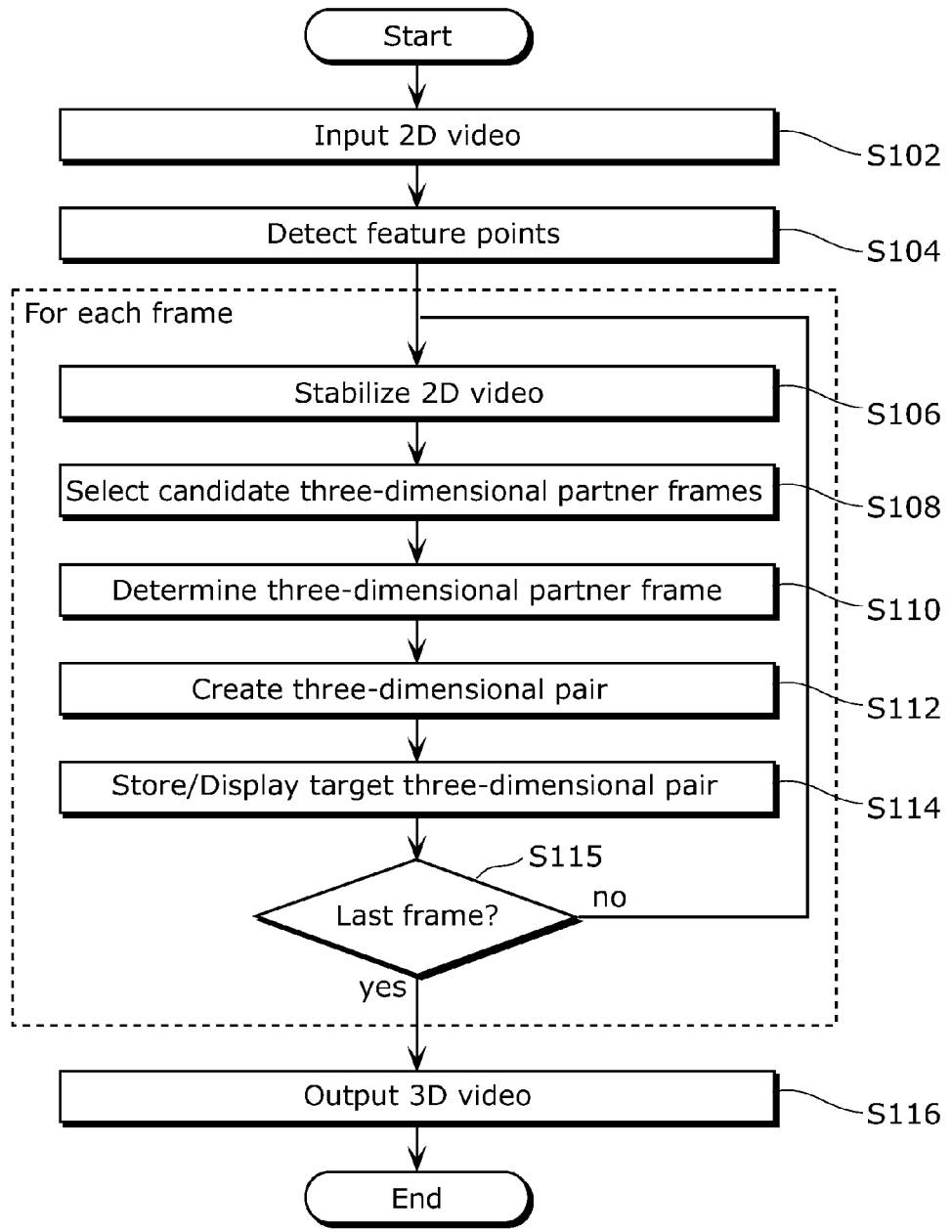
FIG. 4 is a flow chart showing processing performed by a three-dimensional video conversion unit according to Embodiment 1 of the present invention.

FIG. 4 is a flow chart showing processing performed by the three-dimensional video conversion unit 106 according to Embodiment 1 of the present invention.

First, in S102, a 2D video is inputted to the three-dimensional video conversion unit 106. Specifically, the receiving unit 101 inputs 2D video data S13 to the three-dimensional video conversion unit 106.

Next, in S104, the three-dimensional video conversion unit 106 detects corresponding feature points between adjacent frames.

Here, the methods disclosed by the conventional arts are used for the detection (registration/tracking) of the corresponding feature points. It is to be noted that the known method for tracking feature points is disclosed by, for instance, NPL 2. Moreover, the known method for registering feature points is disclosed by, for example, NPL 3. It is to be noted that a method for detecting (registering/tracking) feature points is not limited to the methods disclosed by NPL 2 and NPL 3.

Next, in S106, the three-dimensional video conversion unit 106 stabilizes the 2D video. Specifically, the three-dimensional video conversion unit 106 performs stabilization transformation on a predetermined frame, using a matrix calculated based on corresponding feature points among feature points on a target (reference) frame and feature points on each of the adjacent frames. In more detail, the three-dimensional video conversion unit 106 corrects a fluctuation between one of the frames and another one of the frames by using a projective transformation matrix calculated based on feature points which are corresponding feature points among feature points on the predetermined frame and feature points on each adjacent frame temporally close to the predetermined frame. Consequently, the three-dimensional video conversion unit 106 stabilizes the 2D video.

Next, in S108, the three-dimensional video conversion unit 106 selects candidate three-dimensional partner frames corresponding to the target frame. Specifically, the three-dimensional video conversion unit 106 selects, from among frames constituting the 2D video, frames each of which has a common area that is an area common to the target frame and whose proportion to the frame is greater than or equal to a predetermined value (e.g. 0.9), as the candidate three-dimensional partner frames that are frames which, together with the target frame, constitute a three-dimensional image. For example, the three-dimensional video conversion unit 106 selects, from among the frames constituting the 2D video, frames including the same scene as the target frame.

Next, in S110, the three-dimensional video conversion unit 106 determines a three-dimensional partner frame corresponding to the target frame. Specifically, the three-dimensional video conversion unit 106 determines, from among the candidate three-dimensional partner frames, the three-dimensional partner frame that is a frame which, together with the target frame, constitutes the three-dimensional image, based on the first criteria.

Here, the first criteria are as described above, but include the following criteria (a) to (d). In other words, for the three-dimensional partner frame and the target frame forming a three-dimensional pair, (a) a vertical difference is substantially zero (the vertical difference criterion), (b) a sufficient and appropriate horizontal parallax is present (the horizontal parallax criterion), (c) parallaxes of corresponding points between three-dimensional pairs are similar to each other (the smoothing criterion), and (d) distortion is minimum (the distortion reduction criterion).

Next, in S112, the three-dimensional video conversion unit 106 generates a three-dimensional pair. Specifically, the three-dimensional video conversion unit 106 generates, using the target frame and the three-dimensional partner frame, the three-dimensional pair constituting the three-dimensional image corresponding to the target frame. In other words, the three-dimensional video conversion unit 106 generates the three-dimensional pair, using the stabilized target frame and the three-dimensional partner frame determined based on the first criteria.

Next, in S114, the three-dimensional video conversion unit 106 stores or displays the created three-dimensional pair (target three-dimensional pair). For example, the three-dimensional video conversion unit 106 stores the generated target three-dimensional pair into the internal buffer 110.

Next, in S115, the three-dimensional video conversion unit 106 verifies whether or not the target frame in the generated target three-dimensional pair is the last frame among the frames constituting the 2D video.

In S115, when the three-dimensional video conversion unit 106 verifies that the target frame in the generated target three-dimensional pair is not the last frame (no in S115), the flow returns to S106.

On the other hand, when the three-dimensional video conversion unit 106 verifies that the target frame in the generated target three-dimensional pair is the last frame (yes in S115), the flow proceeds to S116.

Finally, in S116, the three-dimensional video conversion unit 106 outputs a three-dimensional (3D) video made up of the three-dimensional pair generated by the three-dimensional video conversion unit 106.

The three-dimensional video conversion unit 106 converts the 2D video into the 3D video in the above manner.

The following describes in detail S106, S108, and S110 which are characteristic processes of the present invention.

First, S106 is described in detail.

When, for instance, a 2D video to be inputted to the three-dimensional video conversion unit 106 is captured by a camera or the like, one of problems to be solved is the motion of a camera caused by camera shake or other reasons. To put it differently, capturing the 2D video by the camera moved by the camera shake or the like results in an unstable 2D video including a fluctuation or the like. For this reason, even when a 3D video is created from the unstable 2D video, the created 3D video becomes unstable. The unstable 3D video, when viewed by a person, makes the person feel uncomfortable and unpleasant.

In response, the unstable 2D video is stabilized by correcting a fluctuation between one of frames and another one of the frames which is caused by the camera shake or the like. The following describes in detail a stabilization process (S106) performed by the stabilization unit 116.

Figure 5:
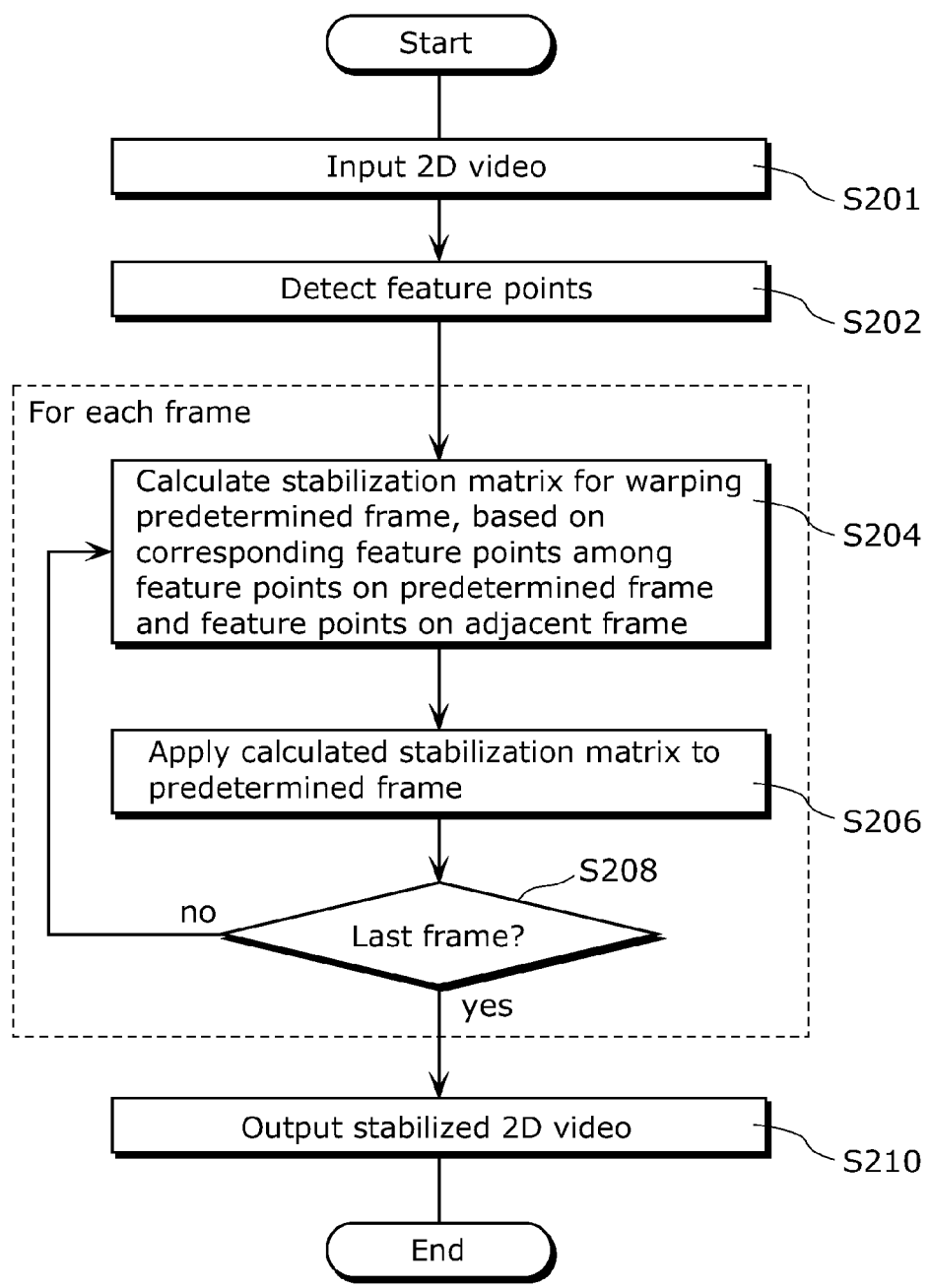
FIG. 5 is a flow chart showing processing performed by the stabilization unit according to Embodiment 1 of the present invention.

FIG. 5 is a flow chart showing processing performed by the stabilization unit 116 according to Embodiment 1 of the present invention.

First, in S201, a 2D video is inputted to the stabilization unit 116. Specifically, the receiving unit 101 inputs 2D video data S13 to the stabilization unit 116.

Next, in S202, the stabilization unit 116 detects (tracks) corresponding feature points between adjacent frames among frames constituting the 2D video (2D video data S13) and feature points on another one of the adjacent frames. Specifically, the detection unit 121 detects feature points which are corresponding feature points among feature points on a predetermined frame and feature points on each of adjacent frames temporally close to the predetermined frame, the predetermined frame and the adjacent frames being included in the frames constituting the 2D video.

Next, in S204, the stabilization unit 116 calculates a stabilization matrix for warping the predetermined frame, based on the corresponding feature points between the predetermined frame and the adjacent frame.

Specifically, the calculation unit 122 calculates a projective transformation matrix which is the stabilization matrix for warping the predetermined frame so that the feature points on the predetermined frame and weighted feature points on a corresponding adjacent frame have the same coordinate value.

More specifically, in S204, a stabilization matrix $S_m$ is calculated to be a matrix for smoothly changing, for an m-th frame $I_m$ as the predetermined frame, feature points on each of corresponding adjacent frames $N_m = \{I_{m-k}, \ldots, I_{m-1}, I_m, I_{m+1}, \ldots I_{m+k}\}$. The stabilization matrix $S_m$ is calculated as a matrix for minimizing an objective function of Equation 1.

[Math. 1]

$$S_m = \underset{S}{\operatorname{argmin}} \sum_{j=m-k}^{m+k} \|SP_m - w_j P_j\|^2 \qquad \text{(Equation 1)}$$

Here, S represents a 3×3 projective transformation matrix, and $S_m$ represents an estimated 3×3 stabilization matrix. $P_j$ represents a 3×k matrix including all feature points (k feature points) on a j-th frame. Each of the columns in the matrices indicates three-dimensional homogeneous coordinates of feature points. $w_j$ represents a weight for the feature points on the j-th frame. When the j-th frame is far from an m-th target frame, the weight becomes smaller. When the j-th frame is close to an m-th frame (predetermined frame), the weight becomes larger. The weight is calculated according to a gauss function shown by Equation 2.

[Math. 2]

$$w_j = G(x) = G(j-m) = \frac{1}{\sqrt{2\pi\sigma}} e^{-(j-m)^2/2\sigma} \qquad \text{(Equation 2)}$$

Here, σ represents a variance gauss function.

Next, in S206, the stabilization unit 116 applies the calculated stabilization matrix to the predetermined frame. Specifically, the stabilization unit 116 corrects a fluctuation between the predetermined frame and the next predetermined frame by applying the calculated projective transformation matrix to the predetermine frame. In this manner, it is possible to stabilize the frames.

Next, in S208, the stabilization unit 116 verifies whether or not the predetermined frame to which the stabilization matrix is applied is the last frame among the frames constituting the 2D video.

When the stabilization unit 116 verifies in S208 that the predetermined frame to which the stabilization matrix is applied is not the last frame (no in S208), the flow returns to S204. On the other hand, when the stabilization unit 116 verifies that the predetermined frame is the last frame (yes in S208), the flow proceeds to S210.

Finally, in S210, the stabilization unit 116 outputs the stabilized 2D video.

Here, the effects of the stabilization unit 116 are described with reference to FIGS. 6 to 8.

Figure 6:
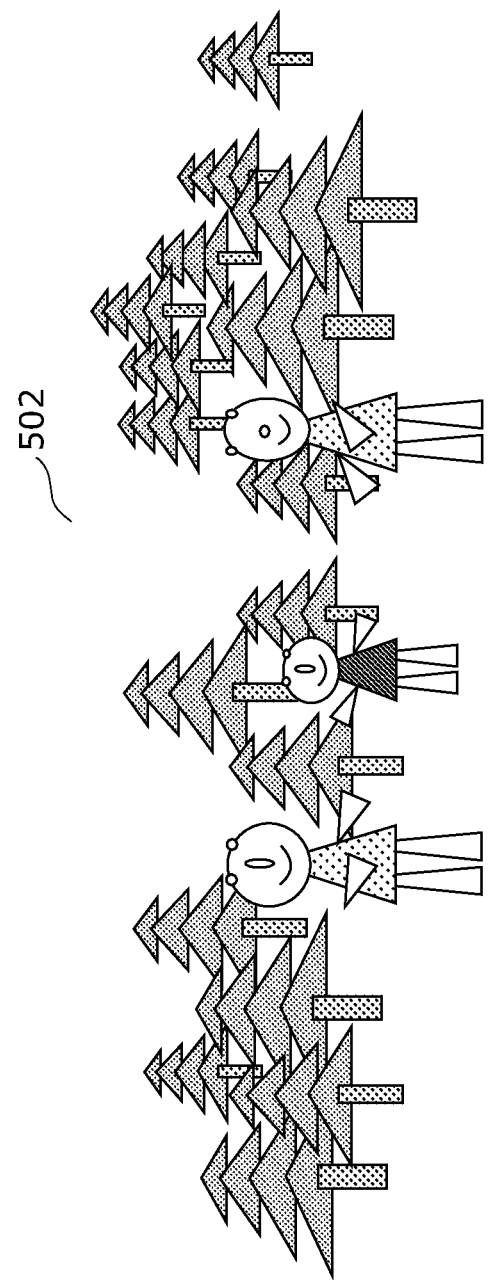
FIG. 6 is a diagram showing an example of a scene to be captured by a handheld video camera according to Embodiment 1 of the present invention.

FIG. 6 is a diagram showing an example of a scene to be captured by a handheld video camera according to Embodiment 1 of the present invention. FIG. 7 is a diagram showing a non-stabilized 2D video captured by the handheld video camera. FIG. 8 is a diagram showing a stabilized 2D video captured by the handheld video camera.

Figure 7:
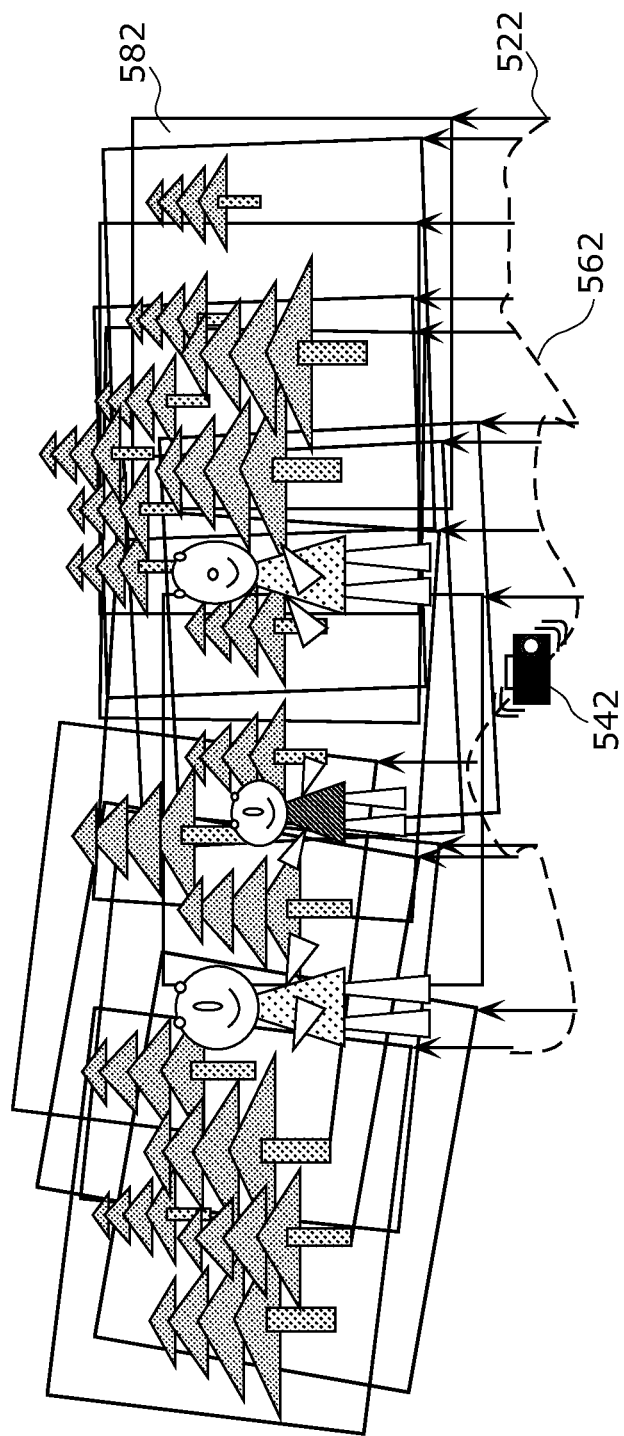
FIG. 7 is a diagram showing a non-stabilized 2D video captured by the handheld video camera according to Embodiment 1 of the present invention.

More specifically, FIG. 7 shows a situation where a scene 502 is captured using a handheld, monocular video camera 542. A user captures the scene 502 in a 2D video by horizontally moving the video camera 542 at fixed height and speed. However, because the user is capturing the scene 502 while holding the video camera 542 with hands, the fluctuation of a trajectory 562 is caused by camera shake. Stated differently, the user is capturing, in the 2D video, the scene 502 along the trajectory 562 of the video camera 542 which is being fluctuated by the camera shake. In short, the video camera 542 captures a video frame 582 (2D video) corresponding to, for example, a video sample point 522 shown in FIG. 7, that is, an unstable 2D video having the fluctuation. Consequently, as stated above, when the 3D video is created from the 2D video, the fluctuation affects the stability of the 3D video.

Here, the video sample point 522 is one of video sample points of the trajectory 562 of the video camera 542, and the video frame 582 is a video frame corresponding to the video sample point 522.

Figure 8:
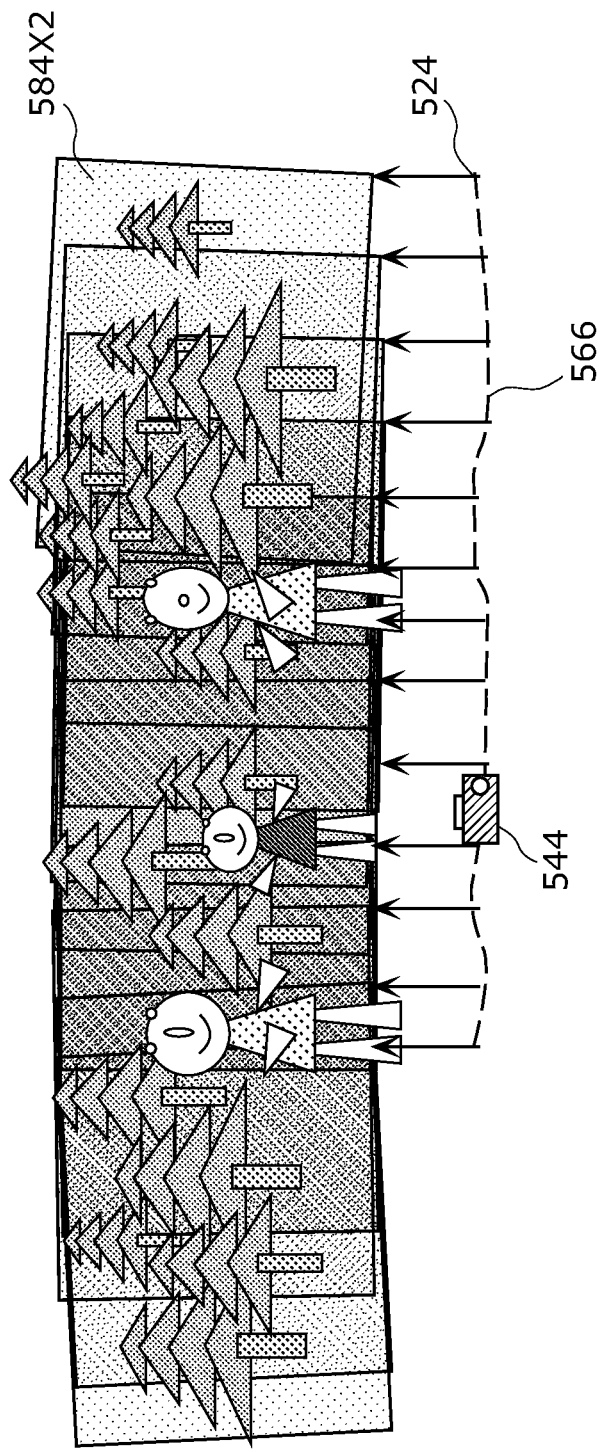
FIG. 8 is a diagram showing a stabilized 2D video captured by the handheld video camera according to Embodiment 1 of the present invention.

In contrast, FIG. 8 shows a situation where the scene 502 is captured using the handheld, monocular video camera 542, and the captured 2D video is stabilized. Specifically, FIG. 8 shows a situation where a virtual video camera 544 captures the scene 502 along a virtual trajectory 566 obtained by virtually stabilizing the fluctuation of the trajectory 562, and thus the stabilized 2D video is generated. Here, FIG. 8 shows a virtual video frame 584 corresponding to a virtual video sample point 524. As is clear from FIG. 7, the fluctuation caused by the camera shake is significantly reduced after the stabilization. Moreover, as shown by the virtual trajectory 566 of the video camera 542, the trajectory 562 is more smoothly stabilized, and video sample points are more uniformed. In other words, the stabilized 2D video has the significantly reduced fluctuation. Consequently, when viewed by a person, the 3D video created from the stabilized 2D video makes the person feel comfortable and pleasant, and thus it is clear that such a 3D video is preferred.

Next, S108 is described in detail.

In S108, the three-dimensional video conversion unit 106 selects, from among the frames constituting the 2D video, frames each of which has a common area that is an area common to the target frame and whose proportion to the frame is greater than or equal to a predetermined value, as candidate three-dimensional partner frames.

For instance, the three-dimensional video conversion unit 106 selects the candidate three-dimensional partner frames based on a ratio between the size of the common area and the size of the target frame. In more detail, when a ratio $r_{mn}$ between the m-th frame (target frame) and an n-th frame is greater than a predetermined value called ratio_infimum, the n-th frame is selected as one of the candidate three-dimensional partner frames.

[Math. 3]

$$C(m) = \{n | r_{mn} > \text{ratio\_infimum}\} \qquad \text{(Equation 3)}$$

C(m) includes all the indices of the candidate three-dimensional partner frames.

Here, the details of the common area are described with reference to FIG. 9.

Figure 9:
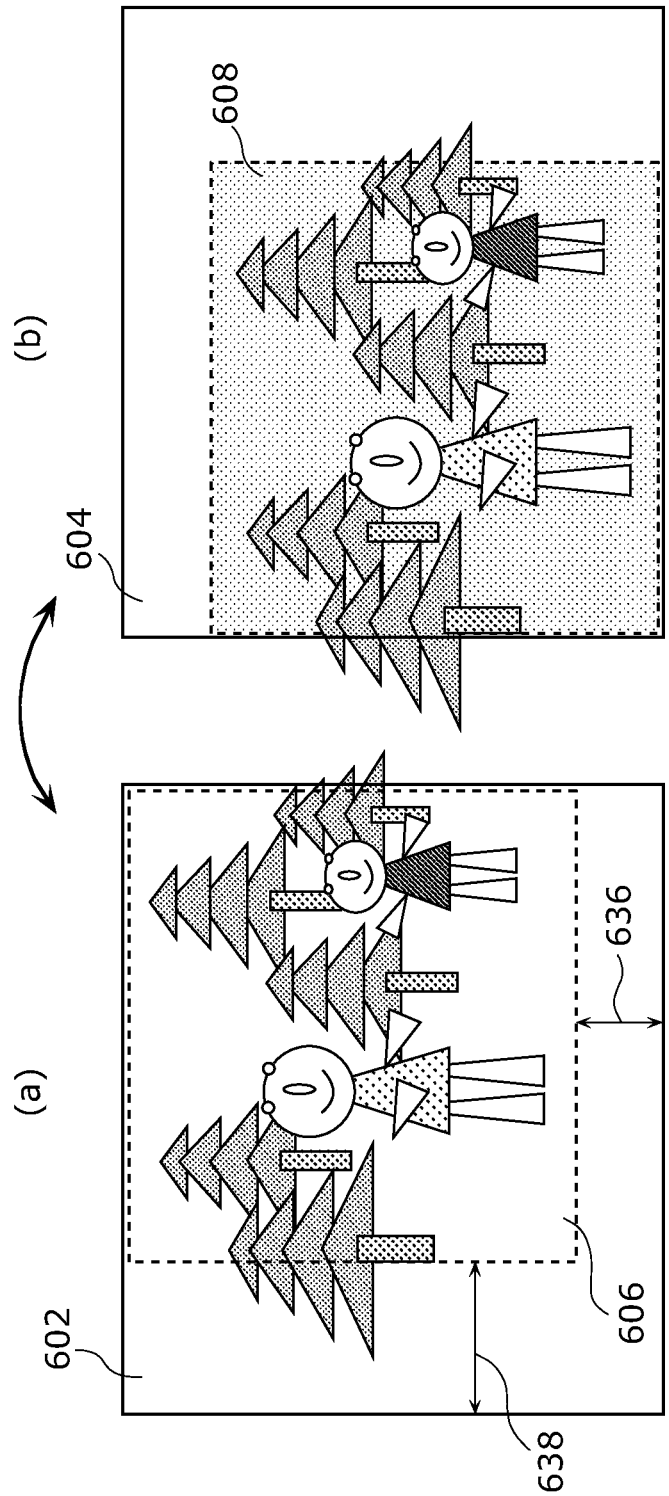
FIG. 9 is a diagram showing common areas of a target frame and a corresponding candidate three-dimensional partner frame according to Embodiment 1 of the present invention.

FIG. 9 is a diagram showing common areas of a target frame and a corresponding candidate three-dimensional partner frame according to Embodiment 1 of the present invention. (a) in FIG. 9 shows a target frame 602, and (b) in FIG. 9 shows a candidate three-dimensional partner frame 604. Moreover, rectangles 606 and 608 each show an outline of the respective common areas that are areas common to the both frames. It is to be noted that the common areas are visual fields of the three-dimensional pair made up of the target frame 602 and the corresponding candidate three-dimensional partner frame 604.

Subsequently, one of methods of calculating a common area is described.

First, the center of gravity of feature points on the m-th frame (a target frame image) is calculated.

Next, the center of gravity of feature points (a common area) on the n-th frame (a frame image) which correspond to the feature points on the target frame image is calculated. It is to be noted that the centers of gravity of the target frame image and the n-th frame image may be simultaneously calculated.

Next, a difference in the centers of gravity of the common areas between the target frame image and the n-th frame image is calculated.

As a result, a vertical difference 636 shown by (a) in FIG. 9 is obtained as a difference in vertical position between the common areas of the target frame image and the n-th frame image. Moreover, a horizontal difference 638 shown by (a) in FIG. 9 is obtained as a difference in horizontal direction between the target frame image and the n-th frame image.

From the above, the size of the common area can be derived from an original frame size (the size of the target frame) and the difference in the centers of gravity of the corresponding feature points between the target frame image and the n-th frame image.

It is to be noted that there is a possibility that this method does make it possible to derive an accurate common area. In other words, there is a possibility of causing a difference between the calculated common area and an actual common area. However, the method is sufficient when applied to the present invention.

Finally, S110 is described in detail.

Figure 10:
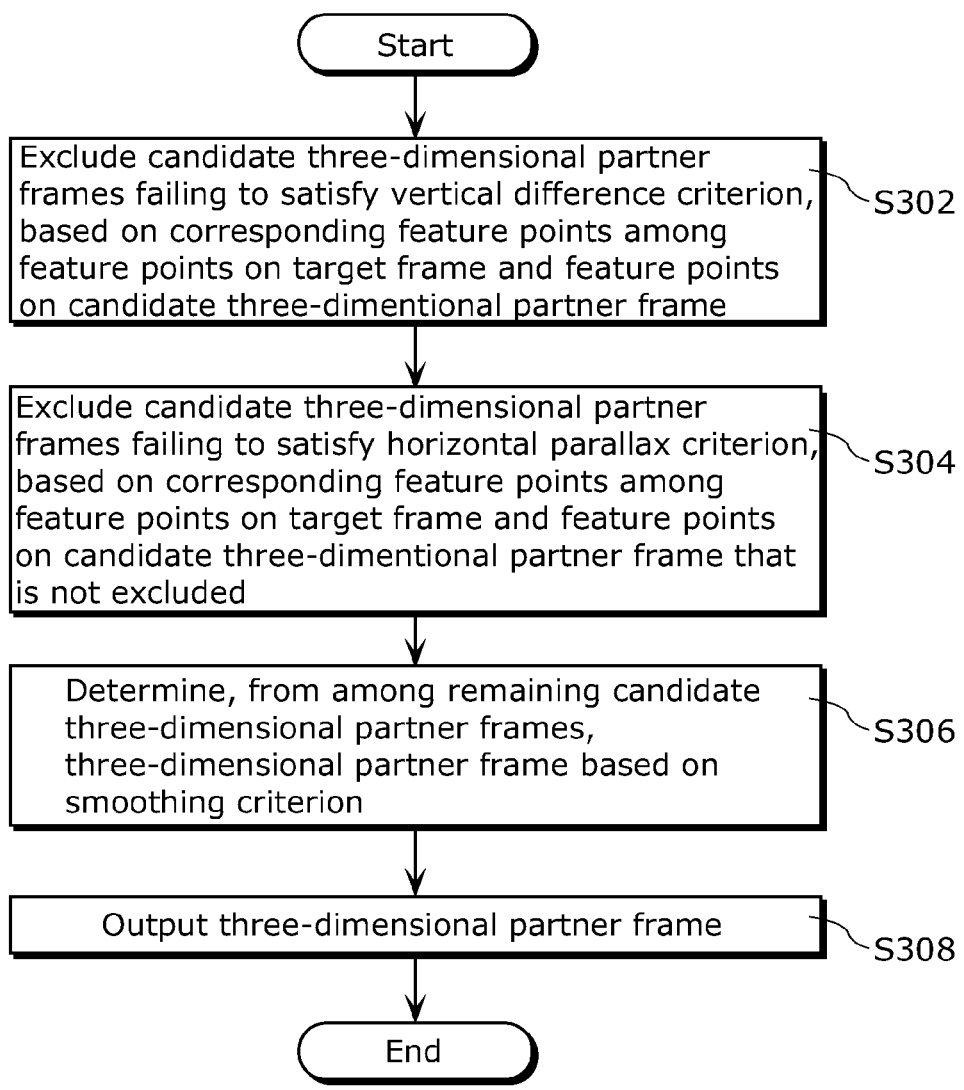
FIG. 10 is a flow chart showing processing performed by a determination unit according to Embodiment 1 of the present invention.

FIG. 10 is a flow chart showing processing performed by the determination unit 124 according to Embodiment 1 of the present invention.

After determining a set of candidate three-dimensional partner frames C(m), the three-dimensional video conversion unit 106 selects a three-dimensional partner frame for the target frame based on the first criteria including the following criteria (a) to (d). It is to be noted that the criteria (a) to (d) to be described below correspond to criteria obtained by saying the aforementioned criteria (a) to (d) in different words.

(a) A y-direction difference between the common areas of the target frame and the three-dimensional partner frame is substantially zero (the vertical difference criterion). Here, the y-direction corresponds to a direction orthogonal to a binocular parallax direction.

(b) An x-direction difference (parallax) between the common areas of the target frame and the three-dimensional partner frame is within a predetermined range that is sufficient for 3D effects and is for creating a comfortable 3D video (the horizontal parallax criterion). Here, the x-direction corresponds to the binocular parallax direction.

(c) A parallax of corresponding points (common areas) between adjacent three-dimensional pairs is smoothly changed (the smoothing criterion).

(d) Warping is performed based on the common areas so that the distortion of the three-dimensional pair is minimized (the distortion reduction criterion). This is because the distortion is caused by the conventional perspective transformation in the present invention.

Specifically, first, in S302, the determination unit 124 excludes a candidate three-dimensional partner frame which does not satisfy the vertical difference of (a), based on the corresponding feature points between the target frame and each of the candidate three-dimensional partner frames. The determination unit 124 uses variance to evaluate the vertical difference. To put it differently, the determination unit 124 calculates the variance of the vertical difference between the target frame and the candidate three-dimensional partner frame. When the calculated variance of the vertical difference is too large, the candidate three-dimensional partner frame is excluded from a set of the candidate three-dimensional partner frames.

Next, in S304, the determination unit 124 excludes a candidate three-dimensional partner frame which does not satisfy the horizontal parallax of (b), based on the corresponding feature points between the target frame and each of the candidate three-dimensional partner frames that are not excluded in S302. The determination unit 124 uses the variance to evaluate the horizontal parallax. Stated differently, the determination unit 124 calculates the variance of the horizontal parallax between the target frame and the candidate three-dimensional partner frame, and excludes the candidate three-dimensional partner frame which does not satisfy the horizontal parallax of (b), based on the calculated variance. This is because when the horizontal parallax is too large, a 3D video to be subsequently created becomes unpleasant, and conversely, when the horizontal parallax is too small, the 3D video to be subsequently created produces fewer 3D effects.

It is to be noted that S302 and S304 may be performed all together. In any case, the determination unit 124 determines candidate three-dimensional partner frames that are filtered (included in the predetermined range), using Equation 4.

[Math. 4]

$$C'(m) = \left\{ n \middle| \begin{pmatrix} n \in C(m) \\ var_{mn}^y < \text{y\_disparity\_supremum} \\ \text{x\_disparity\_supremum} > var_{mn}^x > \\ \text{x\_disparity\_infimum} \end{pmatrix} \right\} \quad \text{(Equation 4)}$$

Here, the determination unit 124 calculates the variance of the horizontal parallax and the variance of the vertical difference using Equation 5 and Equation 6, respectively.

[Math. 5]

$$var_{mn}^x = \Sigma_i ([d_i^{mn}]_x - [\bar{d}^{mn}]_x)/N \quad \text{(Equation 5)}$$

[Math. 6]

$$var_{mn}^y = \Sigma_i ([d_i^{mn}]_y - [\bar{d}^{mn}]_y)/N \quad \text{(Equation 6)}$$

In Equations 5 and 6, $d_i^{mn} = p_i^m - p_i^n$ represents a difference vector indicating a difference between a point on the m-th frame and a corresponding point on the n-th frame. Here, $p_i^m$ represents an i-th point on the m-th frame.

Moreover, $$\bar{d}[x]$$  [Math. 7]

indicates an average of all the points (N points), and the average can be calculated according to Equation 7.

[Math. 8]

$$[\bar{d}]_x = \Sigma_i [d_i]_x / N \quad \text{(Equation 7)}$$

In Equation 7, $[d]_x$ represents the first component of a vector d, and $[d]_y$ represents the second component of the vector d.

Next, in S306, the determination unit 124 determines, from among the remaining candidate three-dimensional partner frames, a three-dimensional partner frame, based on the smoothing criterion described in (c). The determination unit 124 uses the variance to evaluate the smoothing criterion. To put it differently, the determination unit 124 calculates the variance of the horizontal parallax of corresponding points between two adjacent three-dimensional pairs. Then, the determination unit 124 determines the three-dimensional partner frame based on the smoothing criterion, that is, using Equation 8.

[Math. 9]

$$idx(m) = \min_n \sum_i \left( [d_i^{mn}]_x - [d_i^{(m-1)idx(m-1)}]_x \right) \qquad \text{(Equation 8)}$$

In Equation 8, idx(m) represents the index of a three-dimensional partner frame.

It is to be noted that in S108, the three-dimensional partner frame may be determined from among the selected candidate three-dimensional partner frames, not using the distortion reduction criterion of (d) but based on the first criteria including (a) to (c).

However, usually, in S108, any one of the selected candidate three-dimensional partner frames cannot be directly used as a preferred three-dimensional partner frame corresponding to the target frame. This is because the selected candidate three-dimensional partner frames usually contain a distortion. In short, using any one of the selected candidate three-dimensional partner frames as the three-dimensional partner frame affects the final 3D video and fails to produce the comfortable 3D effects.

In response, in S302 to S306, it is preferred to make the determination using candidate three-dimensional partner frames for which the distortion is reduced by using a skew transformation matrix, based on the distortion reduction criterion described in (d). Stated differently, in Equations 5 and 6, it is preferred to calculate the difference vector using Equation 9.

[Math. 10]

$$d_i^{mn} = p_i^m - W_m H_m^n p_i^n \qquad \text{(Equation 9)}$$

In Equation 9, a matrix $H_m^n$ is a projective transformation matrix calculated based on corresponding points between the m-th frame and the n-th frame. A matrix $W_m$ is a skew transformation matrix calculated based on common areas.

It is to be noted that although it is described above that, in S302 to S306, it is preferred to make the determination using the candidate three-dimensional partner frames for which the distortion is reduced by using the skew transformation matrix, based on the distortion reduction criterion described in (d), the present invention is not limited to this. The determination may be made using the candidate three-dimensional partner frames for which the distortion is reduced by using a transformation matrix generated by combining the projective transformation matrix, the skew transformation matrix, and the translation transformation matrix. The following describes the process of generating the transformation matrix with reference to FIG. 11.

Figure 11:
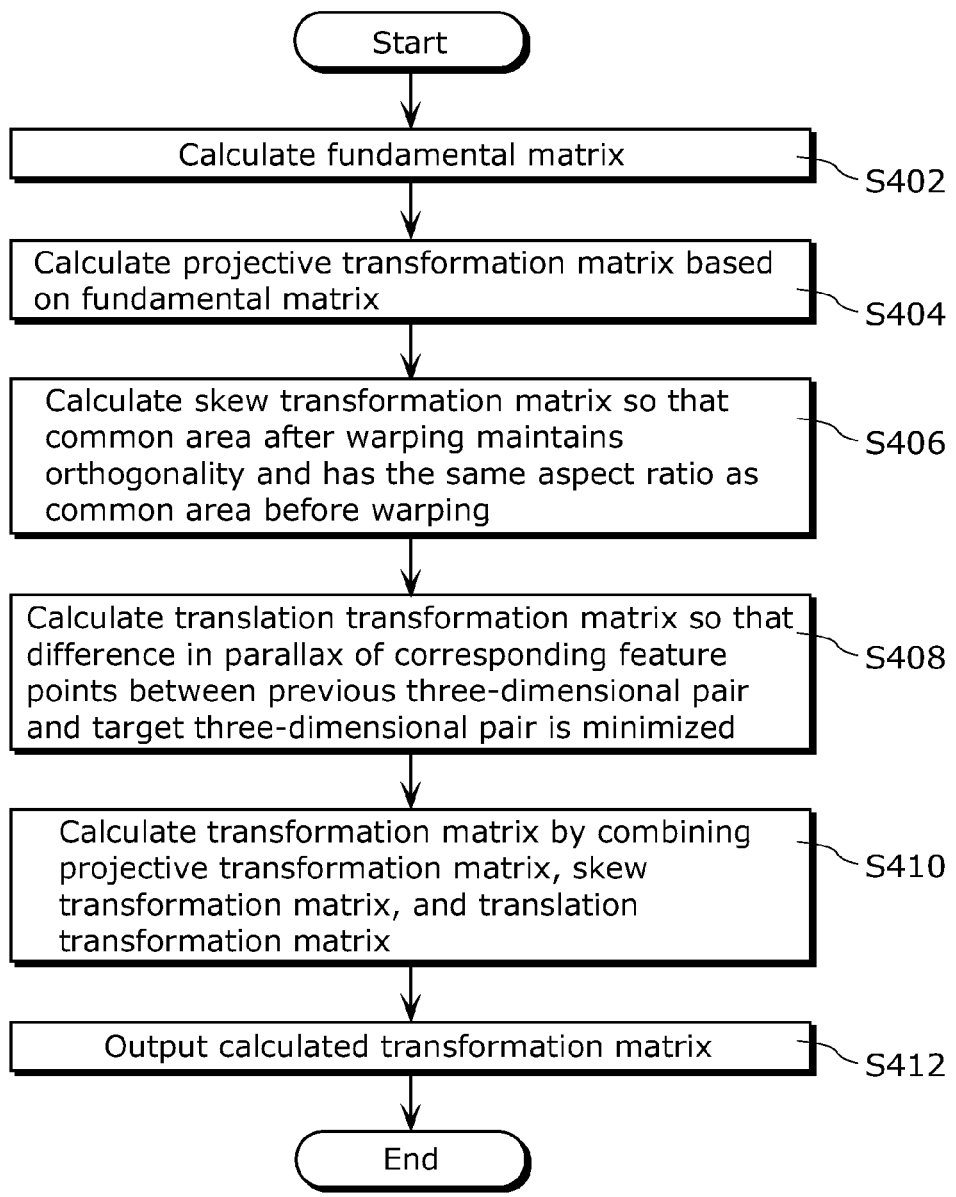
FIG. 11 is a flow chart for illustrating a process of generating a transformation matrix according to Embodiment 1 of the present invention.

FIG. 11 is a flow chart for illustrating the process of generating the transformation matrix according to Embodiment 1 of the present invention. Specifically, the conversion unit 126 generates the transformation matrix based on the target frame and corresponding candidate three-dimensional partner frames. The determination unit 124 determines the three-dimensional partner frame from among the candidate three-dimensional partner frames, using the generated transformation matrix.

First, in S402, the conversion unit 126 calculates a fundamental matrix based on the feature points on the target frame and corresponding feature points on each of the candidate three-dimensional partner frames (feature points of a common area).

Next, in S404, the conversion unit 126 calculates a projective transformation matrix based on the fundamental matrix so that a vertical difference between the common areas of the target frame and the candidate three-dimensional partner frame is minimized.

Specifically, first, the projective transformation matrix shown in Equation 9 is restricted using epipolar geometry as shown in Equation 10. In other words, the projective transformation matrix which is shown in FIG. 9 and matches or is compatible with the fundamental matrix is restricted as shown in Equation 10 (e.g. refer to NPL 4). Consequently, the degrees of freedom of normal projective transformation are not 8 but are reduced to 3.

[Math. 11]

$$H = [e']_x F - e'v^T \qquad \text{(Equation 10)}$$

In Equation 10, H represents a 3×3 projective transformation matrix, and F represents the 3×3 fundamental matrix calculated in S402. Moreover, e' represents 3×1 homogeneous coordinates of an epipole of a candidate three-dimensional partner frame. e' can be derived from the fundamental matrix F. $[a]_x b$ represents an exterior product, and can be also expressed as a×b. $v^T$ represents a 1×3 vector including a parameter indicating three degrees of freedom.

Next, H parameterized by $v^T$ is calculated using Equation 11 so that the vertical difference in the corresponding feature points between the target frame and the candidate three-dimensional partner frame is minimized.

[Math. 12]

$$H_m^n = \min_H \sum_i \left\| [H p_i^n]_y - [p_i^m]_y \right\|^2 \qquad \text{(Equation 11)}$$

It is to be noted that a method of calculating a projective transformation matrix based on a fundamental matrix so as to minimize a vertical difference is not limited to the above method in S404. Other methods may be used if H can be calculated under the same restriction, and are included in the scope of the present invention.

Next, in S406, the conversion unit 126 calculates a skew transformation matrix so that the common area of the three-dimensional partner frame converted using the projective transformation matrix maintains the same orthogonality and aspect ratio as the common area of the three-dimensional partner frame prior to the conversion.

Specifically, the conversion unit 126 calculates, for each of the selected candidate three-dimensional partner frames, the skew transformation matrix for reducing a distortion, based on the distortion reduction criterion described in (d). More specifically, the conversion unit 126 calculates the skew transformation matrix having an amount of skew for restoring the aspect ratio and the orthogonality of the common area.

Figure 12A:
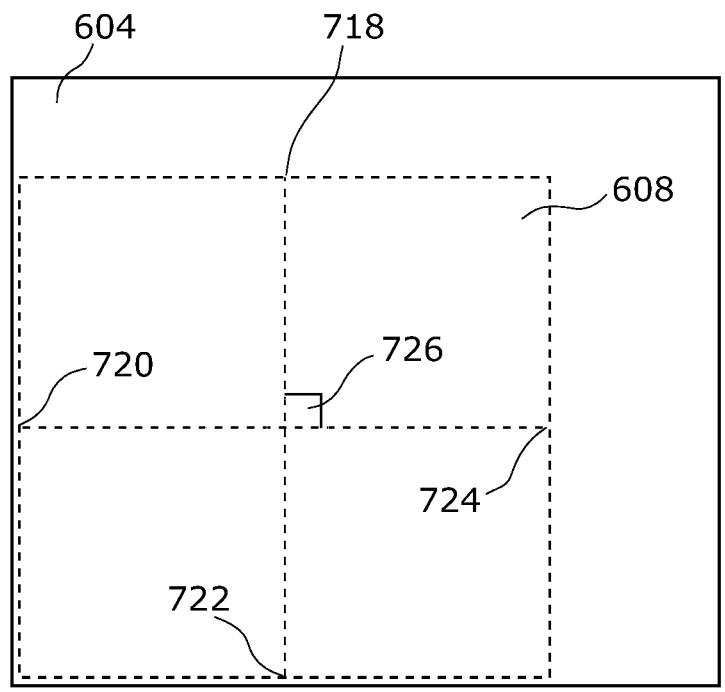
FIG. 12A is a diagram for illustrating terminological concepts according to Embodiment 1 of the present invention.
Figure 12B:
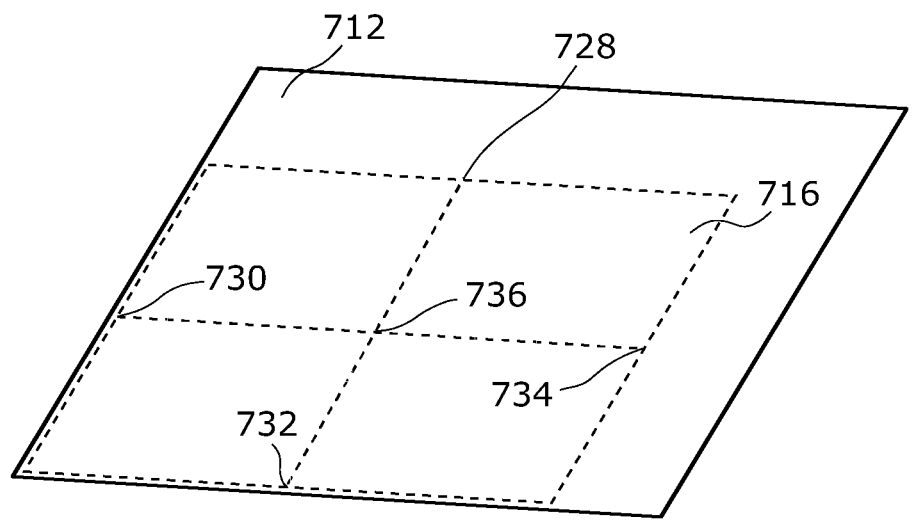
FIG. 12B is a diagram for illustrating terminological concepts according to Embodiment 1 of the present invention.

Here, the terms common area, aspect ratio, and orthogonality are described. Each of FIG. 12A and FIG. 12B is a diagram for illustrating terminological concepts according to Embodiment 1 of the present invention. First, the concept of the common area is described using FIG. 9, and the concepts of the aspect ratio and the orthogonality are described using FIGS. 12A and 12B.

As stated above, FIG. 9 shows the target frame 602 and the candidate three-dimensional partner frame 604. Moreover, the rectangles 606 and 608 each show the outline of the respective common areas that are the areas common to the target frame 602 and the candidate three-dimensional partner frame 604. An area outside of the rectangle 606 or 608 appears only on a corresponding one of the target frame 602 and the candidate three-dimensional partner frame 604.

When a three-dimensional pair (three-dimensional image) is directly formed of the target frame 602 and the candidate three-dimensional partner frame 604, a person feels unpleasant about the outside area when viewing the three-dimensional image. The reason is that the person sees the three-dimensional image as one image, and the human brain cannot extract parallax information for perceiving the depth. It is to be noted that the rectangles 606 and 608 are called not only the common areas but also view areas.

FIG. 12A shows the candidate three-dimensional partner frame 604 before warping, and FIG. 12B shows a candidate three-dimensional partner frame 712 after warping. Here, the warping is synonymous with the application of a transformation matrix. In this embodiment, the warping means the application of a transformation matrix generated by combining a projective transformation matrix, a skew transformation matrix, and a translation transformation matrix.

The rectangle 608 (common area) shown in FIG. 12A has a predetermined aspect ratio. The aspect ratio is expressed by a ratio between a distance between points 718 and 722 and a distance between points 720 and 724. In FIG. 12A, an angle 726 is a right angle. In contrast, a common area 716 after warping shown in FIG. 12B is expressed by a ratio between a distance between warped points 728 and 730 and a distance between points 732 and 734.

It is to be noted that the common area 716 after warping shown in FIG. 12B may have an aspect ratio different from that of the rectangle 618 (common area) shown in FIG. 12A, and the angle 736 may not be the right angle. In this case, the orthogonality and aspect ratio may be further restored using a common shear transformation matrix as shown in Equation 12. The shear transformation matrix is a matrix calculated for restoring the orthogonality and the aspect ratio.

[Math. 13]

$$w = \begin{bmatrix} w1 & w2 & 0 \\ 0 & 1 & 0 \\ 0 & 0 & 1 \end{bmatrix} \quad \text{(Equation 12)}$$

Here, one of the methods of calculating a common area is described.

First, the center of gravity of feature points on a target frame is calculated. Subsequently, the center of gravity of, among feature points on a candidate three-dimensional partner frame, points (a common area) corresponding to the feature points on the target frame is calculated. Then, a difference in the centers of gravity of the corresponding points (common areas) between the target frame and the candidate three-dimensional partner frame is calculated. Here, the vertical difference 636 and the horizontal difference 638 are as shown in FIG. 9. In this way, the size of the common area can be derived from the frame size of the target frame and the difference in the centers of gravity of the corresponding points between the target frame and the candidate three-dimensional partner frame.

It is to be noted that there is a case where this calculation method cannot calculate a perfect common area. In other words, there is a possibility of causing a difference between the calculated common area and an actual common area. However, the calculation method produces sufficiently satisfactory results, and thus there is no problem.

As stated above, in S406, the conversion unit 126 calculates the skew transformation matrix. In so doing, the conversion unit 126 may further calculate the shear transformation matrix.

Next, in S408, the conversion unit 126 calculates a translation transformation matrix so that a parallax between the target frame and the candidate three-dimensional partner frame to which the projective transformation matrix and the skew transformation matrix are applied becomes the same as a parallax between a target frame previous to the target frame and the candidate three-dimensional partner frame.

Specifically, the conversion unit 126 calculates the translation transformation matrix shown in Equation 16 using Equations 13 to 15 shown below so that a smooth depth is achieved. When the translation transformation matrix is applied, a difference between the horizontal parallax of a target three-dimensional pair and the horizontal parallax of a previous three-dimensional pair is minimized, and the vertical difference of the target three-dimensional pair is further minimized.

[Math. 14]

$$v_x = \min_{v_x} \sum_i \left( [p_i^m - p_i^n + v]_x - [d_i^{(m-1)idx(m-1)}]_x \right) \quad \text{(Equation 13)}$$

[Math. 15]

$$v_y = \min_{v_x, v_y} \sum_i \left( [p_i^m - p_i^n + v]_y \right) \quad \text{(Equation 14)}$$

Here, v represents a transformation vector, and can be expressed as Equation 15.

[Math. 16]

$$v = [v_x \ v_y \ 1]^T \quad \text{(Equation 15)}$$

[Math. 17]

$$V = \begin{bmatrix} 1 & 0 & v_x \\ 0 & 1 & v_y \\ 0 & 0 & 1 \end{bmatrix} \quad \text{(Equation 16)}$$

Next, after S406 and S408, in S410, the conversion unit 126 calculates a transformation matrix for each candidate three-dimensional partner frame. Specifically, the conversion unit 126 calculates one transformation matrix (T''=VWH) by combining the projective transformation matrix, the skew transformation matrix, and the translation transformation matrix.

Here, examples of the candidate three-dimensional partner frames include $\{I_n, \text{Warp}(T'', I_n)|n \in C(m)\}$. Stated differently, the transformation matrix thus calculated may be applied to (warping may be performed on) each of the candidate three-dimensional partner frames selected in S108, and then the three-dimensional partner frame may be determined based on the procedure shown in FIG. 10. Moreover, the three-dimensional partner frame may be determined, using the transformation matrix, from among the candidate three-dimensional partner frames selected in S108 (candidate three-dimensional partner frames before warping at this point), based on the procedure shown in FIG. 10.

It is to be noted that it is preferred to determine, using the calculated transformation matrix, the three-dimensional partner frame from among the candidate three-dimensional partner frames selected in S108. In this case, in S112 shown in FIG. 3, the warping is performed based on the transformation matrix generated by the conversion unit 126. This is preferred, because performing the warping in S112 is more efficient than performing conversion (warping) in each of the processes (S302 and S304) shown in FIG. 10.

It is to be noted that the three-dimensional partner frame determined based on the smoothing criterion in S306 may be an original three-dimensional partner frame to which the transformation matrix is not yet applied or a three-dimensional partner frame to which the transformation matrix is applied.

As described above, this embodiment makes it possible to not only create the three-dimensional video without estimation using SFM having high calculation costs but also create the three-dimensional video without time-consuming depth map estimation. Moreover, this embodiment makes it possible to convert, into the stable, comfortable 3D video, the unstable 2D video caused by the camera shake or the like of an image capturing apparatus capturing a 2D video. As a result, the present invention achieves the three-dimensional video creating device and the three-dimensional video creating method which create the appropriate and comfortable 3D video from the 2D video.

Here, the advantageous effects of the three-dimensional video creating device and the three-dimensional video creating method according to this embodiment are described with reference to FIGS. 6 to 8, and 13. The following description assumes that the video camera 542 includes the three-dimensional video creating device.

Figure 13:
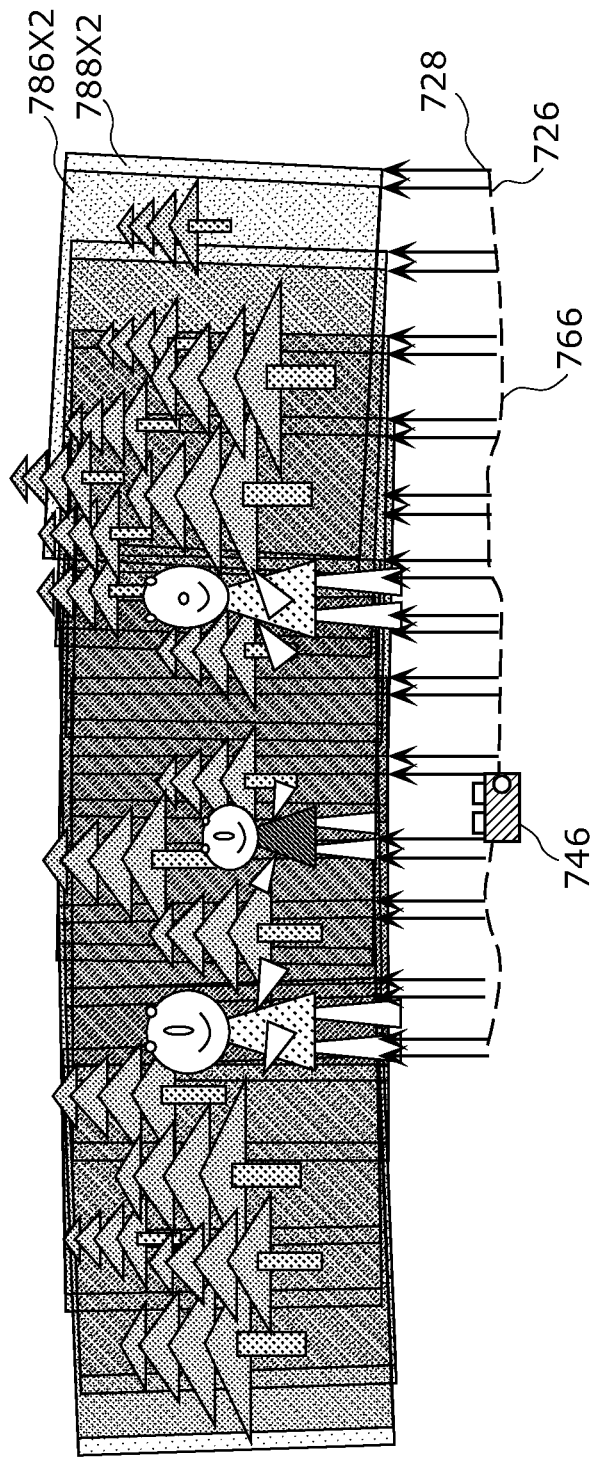
FIG. 13 is a diagram showing a 3D video into which a stabilized 2D video captured by a video camera is three-dimensionally converted according to Embodiment 1 of the present invention.

FIG. 13 is a diagram showing a 3D video into which a stabilized 2D video captured by a video camera is three-dimensionally converted according to Embodiment 1 of the present invention.

First, an operator (user) of the handheld video camera 542 captures, using the video camera 542, the scene 502 shown in FIG. 6. It is to be noted that this embodiment assumes that the scene 502 is, as a typical example, a still object such as a landscape.

Here, the user captures the scene 502 in a 2D video by horizontally moving the video camera 542 at fixed height and speed. That is to say, the user captures the scene 502 in the 2D video by moving the video camera 542 along the trajectory 562.

However, because the user is capturing the scene 502 while holding the video camera 542 with hands, the fluctuation of the trajectory 562 is caused by camera shake. In short, the video camera 542 captures the video frame 582 (2D video) corresponding to, for example, the video sample point 522 shown in FIG. 7, that is, the unstable 2D video having the fluctuation. Only the unpleasant and inappropriate 3D video is created from the unstable 2D video. For this reason, in this embodiment, the 2D video is stabilized before the 2D video is converted into the three-dimensional (3D) video.

Next, the video camera 542 stabilizes the captured 2D video. FIG. 8 schematically shows the stabilized 2D video. The 2D video is corrected (stabilized) as if the virtual video camera 544 captures the scene 502 along the virtual trajectory 566 indicating the trajectory 562 corrected for significantly reducing the fluctuation caused by the camera shake. For instance, the virtual video camera 544 captures the virtual video frame 584 corresponding to the virtual video sample point 524 show in FIG. 8, that is, the stable 2D video for which the fluctuation is significantly reduced. To put it differently, as shown by the virtual trajectory 566 of the virtual video camera 544, the trajectory 562 is more smoothed, and virtual video sample points 524 are more uniformed. Thus, it is possible to create the comfortable and appropriate 3D video from the stabilized 2D video.

Next, the video camera 542 performs three-dimensional video conversion on the stabilized 2D video, to create the 3D video. FIG. 13 schematically shows the created 3D video. Stated differently, a virtual video camera 746 creates the stabilized 3D video along a virtual trajectory 766. For example, the virtual video camera 746 creates three-dimensional video frame pairs 786 and 788 respectively corresponding to virtual three-dimensional video sample points 726 and 728.

In this way, the video camera 542 can create the appropriate and pleasant 3D video from the 2D video.

Figure 14:
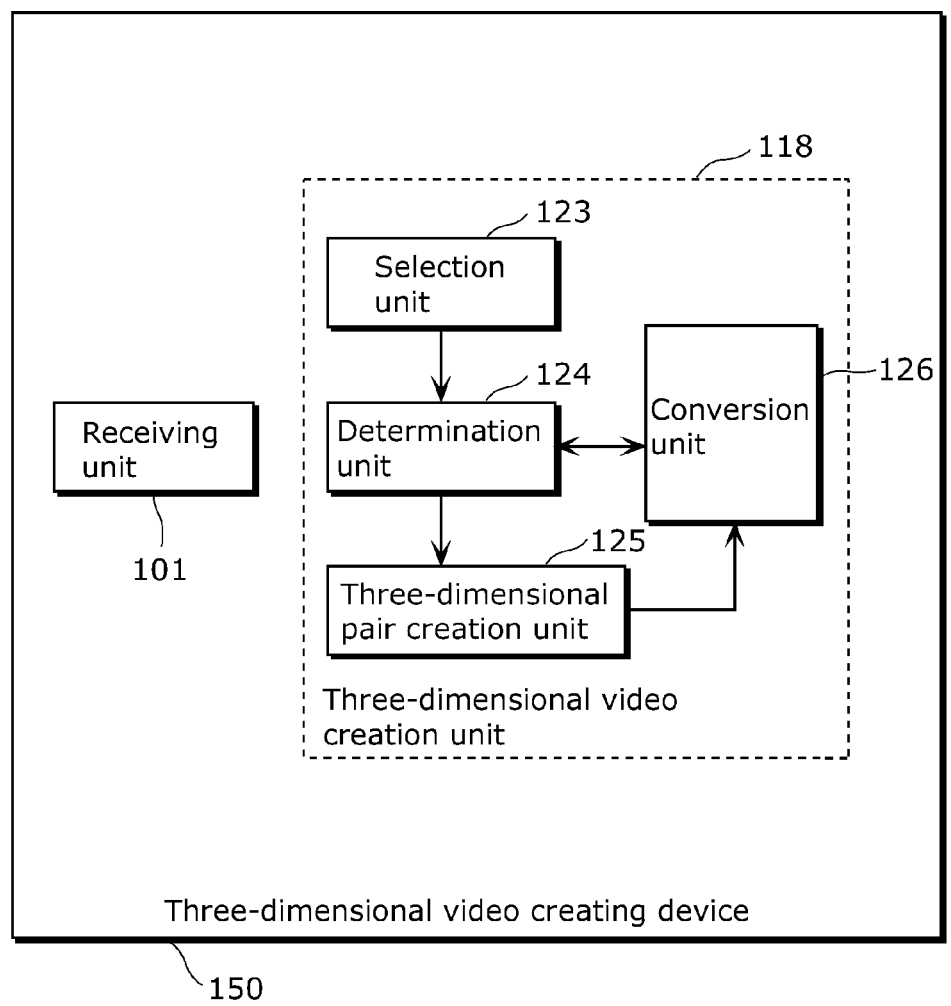
FIG. 14 is a block diagram showing a minimum configuration of a three-dimensional video creating device according to an implementation of the present invention.

It is to be noted that although the three-dimensional video creating device 100 according to this embodiment includes the receiving unit 101, the three-dimensional video conversion unit 106, the video output unit 108, and the internal buffer 110 in the above description, the present invention is not limited to this. As shown in FIG. 14, examples of the minimum configuration of the three-dimensional video creating device 100 include a three-dimensional video creating device 150 including at least the receiving unit 101 and the three-dimensional video creation unit 118 including the selection unit 123, the determination unit 124, the three-dimensional pair creation unit 125, and the conversion unit 126. Here, FIG. 14 is a block diagram showing the minimum configuration of the three-dimensional video creating device according to Embodiment 1 of the present invention. The same reference signs are assigned to the same elements as in FIG. 1, and a detailed description thereof is omitted.

Figure 15:
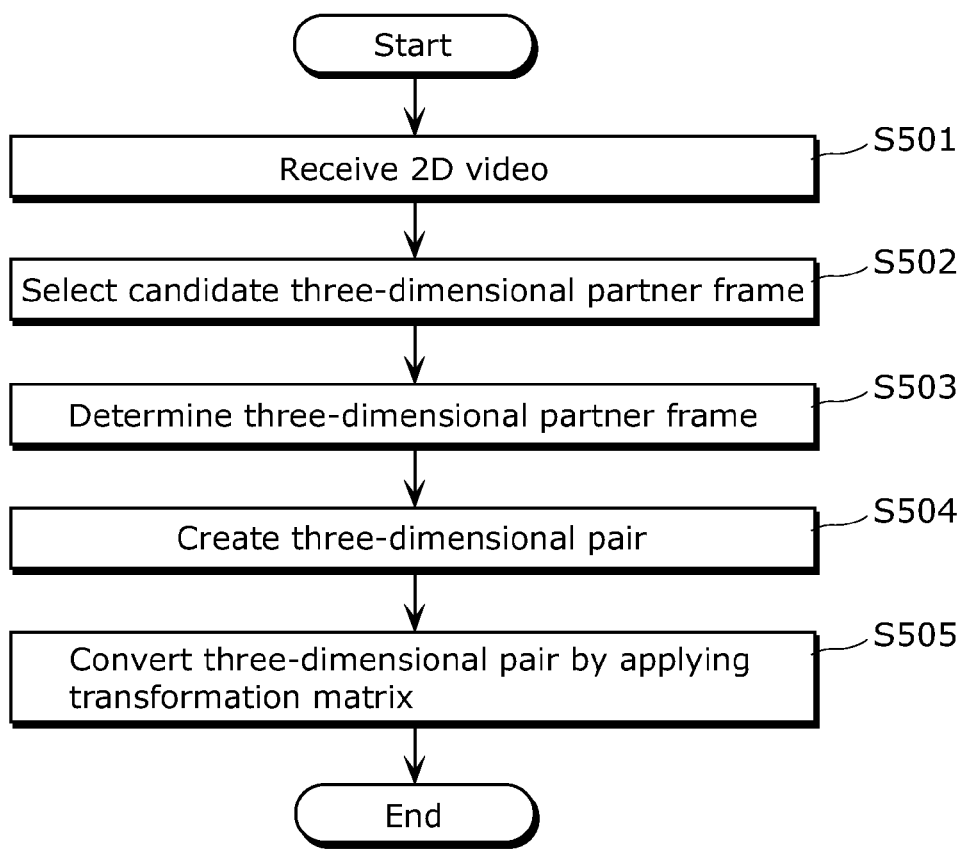
FIG. 15 is a flow chart showing operations of the three-dimensional video creating device shown in FIG. 14.

The three-dimensional video creating device 150 creates a 3D video from a 2D video through a procedure shown in FIG. 15. FIG. 15 is a flow chart showing operations of the three-dimensional video creating device shown in FIG. 14.

First, in S501, the receiving unit 101 receives a 2D video.

Next, in S502, the selection unit 123 selects, from among frames constituting the 2D video, frames each of which has a common area whose proportion to the frame is greater than or equal to a predetermined value, as candidate three-dimensional partner frames that are candidate frames each constituting a three-dimensional image together with a target frame. Here, each common area is an area of an image common to the target frame.

Next, in S503, the determination unit 124 determines, from among the candidate three-dimensional partner frames, a three-dimensional partner frame that is a frame which, together with the target frame, constitutes the three-dimensional image, based on the first criteria.

Next, in S504, the three-dimensional pair creation unit 125 creates, using the target frame and the three-dimensional partner frame, a three-dimensional pair constituting the three-dimensional image.

Finally, in S505, the conversion unit 126 generates a transformation matrix based on the target frame and the determined three-dimensional partner frame, and converts the three-dimensional pair by applying the generated transformation matrix to the three-dimensional pair, based on the first criteria.

In this way, the appropriate and pleasant 3D video is created from the 2D video without the estimation using the SFM having the high calculation costs or the time-consuming depth map estimation. In other words, the appropriate and pleasant 3D video is created from the 2D video by using the method of selecting, from among the frames constituting the 2D video, the candidate three-dimensional partner frames corresponding to the target frame and determining the three-dimensional partner frame from among the selected candidate three-dimensional partner frames based on the first criteria.

As a result, it is possible to create the appropriate and pleasant 3D video from the 2D video.

It is to be noted that it is possible to create the appropriate and pleasant 3D video from the 2D video by performing the stabilization process on the unstable 2D video caused by the camera shake or the like of the image capturing apparatus capturing the 2D video.

Embodiment 2

Figure 16:
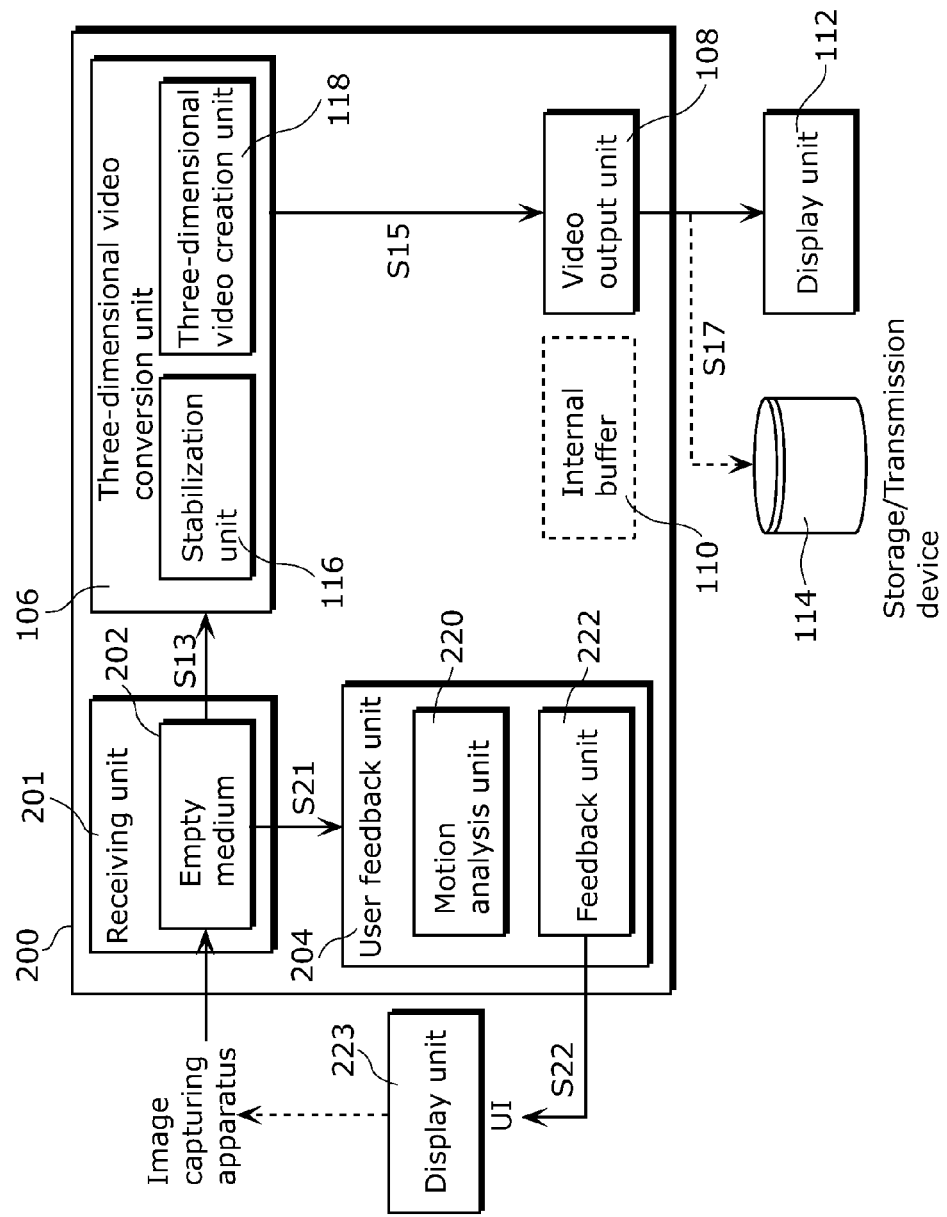
FIG. 16 is a block diagram showing a configuration of a three-dimensional video creating device according to Embodiment 2 of the present invention.

FIG. 16 is a block diagram showing a configuration of a three-dimensional video creating device according to Embodiment 2 of the present invention. The same reference signs are assigned to the same elements as in FIG. 1, and a detailed description thereof is omitted.

A three-dimensional video creating device 200 shown in FIG. 16 differs from the three-dimensional video creating device 100 according to Embodiment 1 in the configuration of a receiving unit 201 and the addition of a user feedback unit 204. Moreover, the three-dimensional video creating device 200 is connected to a display unit 223.

The receiving unit 201 receives a 2D video captured by a user operating an image capturing apparatus such as a camera. Specifically, the receiving unit 201 includes, for instance, an empty medium 202, and receives image data from the image capturing apparatus such as the camera. The receiving unit 201 outputs 2D video data S13 to the three-dimensional video conversion unit 106, and transmits original image data S21 to the user feedback unit 204. It is to be noted that, for example, only when a preview path/preview mode is set in the three-dimensional video creating device 200, the receiving unit 201 may transmit the original image data S21 to the user feedback unit 204.

The user feedback unit 204 includes a motion analysis unit 220 and a feedback unit 222, and transmits, to the display unit 223, feedback information for feeding back, to the user, in real time the 2D video captured by the user operating the image capturing apparatus. Here, the feedback information is information for guiding the user to capture a stabilized 2D video, such as an arrow indicating an image capturing direction and a signal indicating the motion of the image capturing apparatus.

The motion analysis unit 220 corresponds to an analysis unit according to an implementation of the present invention. The motion analysis unit 220 analyzes the motion of the image capturing apparatus, and generates the information for guiding the user to capture the stabilized 2D video.

The feedback unit 222 generates the feedback information for giving a feed back to the user, based on the information generated by the motion analysis unit 220.

The display unit 223 is a camera monitor or the like, and displays the generated feedback information and the 2D video. It is to be noted that the display unit 223 may guide the user to capture a video in the best manner for the three-dimensional video creating device 200 to produce the preferred 3D effects, based on the transmitted feedback information.

The three-dimensional video creating device 200 is thus configured.

It is to be noted that although the three-dimensional video creating device 200 (the user feedback unit 204 or the three-dimensional video conversion unit 106) is typically achieved in the form of an IC (integrated circuit), an ASIC (application-specific integrated circuit), or an LSI (large scale integrated circuit), the three-dimensional video creating device 200 may be configured of a plurality of chips or a single chip. It is to be noted that each of the three-dimensional video creating device 200, the user feedback unit 204, and the three-dimensional video conversion unit 106 is not limited to be achieved in the form of the LSI. Each of the three-dimensional video creating device 200, the user feedback unit 204, and the three-dimensional video conversion unit 106 may be achieved in the form of the IC, a system LSI, a super LSI, or an ultra LSI depending on the degree of integration.

Moreover, the three-dimensional video creating device 200 or the like may be integrated using a special circuit or a general-purpose processor. Examples of the special circuit include a specialized microprocessor such as a DSP (digital signal processor) controllable by a program instruction.

Furthermore, FPGA (Field Programmable Gate Array) that can be programmed after manufacturing LSIs or a reconfigurable processor that allows re-configuration of the connection or configuration of an LSI may be used for the three-dimensional video creating device 200 or the like. In the future, when, with advancement in manufacturing and processing technologies, a brand-new technology may replace LSI, the three-dimensional video creating device 200 or the like may be integrated using such a technology.

Moreover, the three-dimensional video creating device 200 may be implemented in a liquid crystal display device which displays images (videos) in chronological order, a plasma display device, a display device to which a lenticular lens layer is added, or a display device capable of displaying a three-dimensional image of a display device of a different type or the like.

Furthermore, the three-dimensional video creating device 200 may be implemented in a digital media player apparatus such as a digital video disc player, a blu-ray disc player, and a digital media player of a different type. The three-dimensional video creating device 200 may be implemented in an apparatus of a different type. Any of the above cases does not limit the scope of the present invention.

Embodiment 3

Embodiment 3 describes an example where an apparatus different from those in Embodiments 1 and 2 includes the three-dimensional video conversion unit.

FIG. 17 is a block diagram showing a configuration of an imaging apparatus according to Embodiment 3 of the present invention. The same reference signs are assigned to the same elements as in FIG. 1, and a detailed description thereof is omitted.

An imaging apparatus 1200 shown in FIG. 17 includes an optical system 1202, a video sensor 1204, an analog-to-digital converter (ADC) 1206, a video processor 1208, a microcomputer 1210, an external memory 1212, a driver controller 1220, an operation unit 1222, a storage/transmission device 1216, and a display device 1214.

Here, the video processor 1208 includes an internal memory 1240, the three-dimensional video conversion unit 106, an original image processor 1242, and a color image processor 1244. It is to be noted that although other constituent elements such as a microphone and a speaker are not shown, this does not limit the scope of the present invention.

The optical system 1202 controls an optical signal reaching the video sensor 1204. The optical system 1202 includes constituent elements such as lenses or a lens set, a zoom/focus mechanism, an actuator, a shutter, and an aperture. The optical system 1202 is controlled by, for instance, the driver controller 1220.

The driver controller 1220 controls the actuator or the like in the optical system 1202 under the control of the microcomputer 1210. The driver controller 1220 is capable of moving the lens of the optical system 1202 so as to correct a fluctuation, and thus is capable of reducing blur resulting from camera shake or the motion of a camera.

The operation unit 1222 receives an operation input from a user, and transmits the electrical signal of the operation input to the microcomputer 1210. By transmitting the electrical signal, the operation unit 1222 is capable of controlling modules such as the driver controller 1220, the video sensor 1204, and the video processor 1208 that coordinate in response to the input from the user.

The microcomputer 1210 controls the driver controller 1220 and the video sensor 1204.

The video sensor 1204 accumulates an incident light signal, and converts the optical signal into an electrical signal. The microcomputer 1210 controls the video sensor 1204.

The ADC 1206 converts the electrical signal converted by the video sensor 1204 into digital data (original image data), and stores the digital data into the internal memory 1240 or the external memory 1212.

The original image processor 1242 obtains the original image data from the internal memory 1240 (or the external memory 1212), and performs, on the original image data, many preprocesses such as noise reduction, linearity correction, white balance, and gamma correction. The original image processor 1242 outputs an original image resulting from the performed preprocesses, to the storage/transmission device 1216 or the color image processor 1244.

The color image processor 1244 processes the original image resulting from the preprocesses performed by the original image processor 1242, to generate a color image such as an RGB image and an YCbCr image. Here, the processing of the color image processor 1244 includes processes such as color interpolation, color correction, adjustment of color tone range, and color noise reduction, and results in generating a suitable color image.

The three-dimensional video conversion unit 106 includes two sub modules, the stabilization unit 116 and the three-dimensional video creation unit 118. The three-dimensional video conversion unit 106 obtains a video frame from the internal memory 1240, stabilizes the video frame, and then converts the video frame into a 3D video. The three-dimensional video conversion unit 106 outputs the converted 3D video to the display device 1214 or the external memory 1212. It is to be noted that the details of the three-dimensional video conversion unit 106 are described above, and thus a description thereof is omitted here.

The display device 1214 is, for example, a liquid crystal monitor to which a lenticular lens capable of displaying a 3D image is added. The display device 1214 is capable of displaying the 3D video outputted from the three-dimensional video conversion unit 106. It is to be noted that the display device 1214 may display, as a 2D video, the 3D video outputted from the three-dimensional video conversion unit 106, or may store the 3D video into the storage/transmission device 1216.

The storage/transmission device 1216 stores or transmits the original image resulting from the preprocesses performed by the original image processor 1242 and the 3D video outputted from the three-dimensional video conversion unit 106. It is to be noted that the storage/transmission device 1216 may cause a compression unit (not shown) to compress the original image resulting from the preprocesses performed by the original image processor 1242 and the 3D video outputted from the three-dimensional video conversion unit 106 prior to the storing/transmitting.

The storage/transmission device 1216 may include, but not limited to, for instance, a flash-based memory card, a hard drive, and an optical drive. Moreover, the storage/transmission device 126 includes, but not limited to, for example, an HDMI interface, a USB interface, a wireless interface, and a direct-to-printer interface. The storage/transmission device 1216 may arbitrarily perform lossless compression or lossy compression on data to be processed (stored or transmitted).

Although the video processor 1208 and the internal modules are typically achieved in the form of an IC (integrated circuit), an ASIC (application-specific integrated circuit), or an LSI (large scale integrated circuit), the video processor 1208 and each of the internal modules may be configured of a plurality of chips or a single chip. It is to be noted that each of the three-dimensional video creating device 100, the three-dimensional video conversion unit 106, and the like is not limited to be achieved in the form of the LSI. Each of the three-dimensional video creating device 100, the three-dimensional video conversion unit 106, and the like may be achieved in the form of the IC, a system LSI, a super LSI, or an ultra LSI depending on the degree of integration.

Moreover, each of the video processor 1208 and the internal modules may be integrated using a special circuit or a general-purpose processor. Examples of the special circuit include a specialized microprocessor such as a DSP (digital signal processor) controllable by a program instruction.

Furthermore, FPGA (Field Programmable Gate Array) that can be programmed after manufacturing LSIs or a reconfigurable processor that allows re-configuration of the connection or configuration of an LSI may be used for each of the video processor 1208 and the internal modules. In the future, when, with advancement in manufacturing and processing technologies, a brand-new technology may replace LSI, the video processor 1208 and each internal module may be integrated using such a technology.

As described above, this embodiment makes it possible to not only create the three-dimensional video without estimation using SFM having high calculation costs but also create the three-dimensional video without time-consuming depth map estimation. As a result, the present invention achieves the three-dimensional video creating device and the three-dimensional video creating method which create the appropriate and comfortable 3D video from the 2D video.

Specifically, the three-dimensional video creating device according to this embodiment receives the 2D video, and detects (tracks) the corresponding points between the successive video frames. The three-dimensional video creating device performs the stabilization process on the target frame based on the corresponding points between the target frame and each of the adjacent frames. It is to be noted that the three-dimensional video creating device may not necessarily perform the stabilization process on a previously stable 2D video.

The three-dimensional video creating device selects the candidate three-dimensional partner frames corresponding to the target frame according to the size of the common area between the target frame and each of the candidate three-dimensional partner frames.

Moreover, the three-dimensional video creating device calculates the projective transformation matrix which satisfies the epipolar constraint and the condition that the vertical difference becomes zero between the target frame and each candidate three-dimensional partner frame. The three-dimensional video creating device also calculates the skew transformation matrix for reducing the distortion caused when the projective transformation matrix is applied, and calculates the translation transformation matrix for minimizing the parallax difference in the corresponding points between the target frame and each adjacent frame.

Moreover, the three-dimensional video creating device determines, from among the candidate three-dimensional partner frames, the three-dimensional partner frame based on the first criteria, using the calculated projective transformation matrix, skew transformation matrix, and translation transformation matrix.

Here, the first criteria include the vertical difference criterion, the horizontal parallax criterion (base line), the smoothing criterion, and the distortion reduction criterion. The vertical difference criterion specifies that the y-direction (vertical) difference between the target frame and the three-dimensional partner frame is zero. The horizontal parallax criterion (base line) specifies that the x-direction (horizontal) parallax between the target frame and the three-dimensional partner frame is within the appropriate range that is sufficient for the 3D effects and is for providing comfortable 3D viewing. The smoothing criterion defines the depth direction and specifies that the parallax between the corresponding points between the adjacent three-dimensional pairs (each of the three-dimensional pairs including a target frame and a corresponding three-dimensional partner frame) is within the range in which the parallax is smooth. The distortion reduction criterion specifies that the three-dimensional pair is generated based on the common areas without being affected by the conventional transformation causing the distortion.

The three-dimensional video creating device warps (transforms) the determined three-dimensional partner frame (three-dimensional pair) by applying, to the three-dimensional partner frame, the transformation matrix generated by combining the projective transformation matrix, the skew transformation matrix, and the translation transformation matrix.

At this stage, the three-dimensional video creating device outputs, as the three-dimensional pair constituting the 3D image, the target frame and the warped three-dimensional partner frame.

In this manner, the three-dimensional video creating device repeats the above processes until the target frame reaches the final frame constituting the 2D video, and outputs the 3D video generated from the three-dimensional pair.

Although the three-dimensional video creating device and the three-dimensional video creating method have been described above based on the embodiments, the present invention is not limited to the embodiments. Although only some exemplary embodiments have been described in detail above, those skilled in the art will readily appreciate that many modifications are possible in the exemplary embodiments without materially departing from the novel teachings and advantages of the inventive concept of the present disclosure. Accordingly, all such modifications are intended to be included within the scope of the inventive concept of the present disclosure.

INDUSTRIAL APPLICABILITY

The present invention can be applied to three-dimensional video creating devices and three-dimensional video creating methods, and particularly to liquid crystal display devices, plasma display devices, display devices to which a lenticular lens layer is added, or three-dimensional video creating devices and three-dimensional video creating methods implemented in digital video disc players, blu-ray disc players, and so on.

REFERENCE SIGNS LIST 100, 150, 200 Three-dimensional video creating device
101, 201 Receiving unit
102 Storage medium reader
104 Video decoder
106 Three-dimensional video conversion unit
108 Video output unit
110 Internal buffer
112, 223 Display unit
114 Storage/Transmission device
116 Stabilization unit
118 Three-dimensional video creation unit
121 Detection unit
122 Calculation unit
123 Selection unit
124 Determination unit
125 Three-dimensional pair creation unit
126 Conversion unit
202 Empty medium
204 User feedback unit
220 Motion analysis unit
222 Feedback unit
502 Scene
506, 508, 606, 608, 618 Rectangle
522 Video sample point
524 Virtual video sample point
542 Video camera
544, 746 Virtual video camera
562 Trajectory
566, 766 Virtual trajectory
582 Video frame
584 Virtual video frame
602 Target frame
604, 712 Candidate three-dimensional partner frame
636 Vertical difference
638 Horizontal difference
716 Common area
718, 720, 722, 724, 728, 730, 732, 734 Point
726, 736 Angle
726, 728 Virtual three-dimensional video sample point
786, 788 Three-dimensional video frame pair
1200 Imaging apparatus
1202 Optical system
1204 Video sensor
1208 Video processor
1210 Microcomputer
1212 External memory
1214 Display device
1216 Storage/Transmission device
1220 Driver controller
1222 Operation unit 1240 Internal memory
1242 Original image processor
1244 Color image processor

The invention claimed is:

1. A three-dimensional video creating device which creates a three-dimensional (3D) video from a two-dimensional (2D) video, said three-dimensional video creating device comprising:
a receiving unit configured to receive a 2D video;
a selection unit configured to select, from among frames constituting the 2D video, frames each of which has a common area whose proportion to the frame is greater than or equal to a predetermined value, as candidate three-dimensional partner frames that are candidate frames each constituting a three-dimensional image together with a target frame included in the frames constituting the 2D video, each of the common areas being an area of an image common to the target frame;
a determination unit configured to determine, from among the candidate three-dimensional partner frames, a three-dimensional partner frame that is a frame which, together with the target frame, constitutes a three-dimensional image, based on predetermined criteria;
a three-dimensional pair creation unit configured to create a three-dimensional pair constituting the three-dimensional image corresponding to the target frame, using the target frame and the three-dimensional partner frame; and
a conversion unit configured to generate, from the target frame and the candidate three-dimensional partner frames selected by said selection unit, a transformation matrix for warping the candidate three-dimensional partner frames, and convert the three-dimensional pair by applying the generated transformation matrix to the three-dimensional pair.

2. The three-dimensional video creating device according to claim 1, further comprising
a stabilization unit configured to stabilize the frames constituting the 2D video by correcting a fluctuation between one of the frames and another one of the frames,
wherein said selection unit is configured to select, from among the frames constituting the 2D video and stabilized by said stabilization unit, candidate three-dimensional partner frames.

3. The three-dimensional video creating device according to claim 1, further comprising:
a storage unit in which the three-dimensional pair converted by said conversion unit is stored; and
an output unit configured to output the converted three-dimensional pair stored in said storage unit,
wherein said output unit is configured to output the three-dimensional pair which corresponds to each of the frames constituting the 2D video and is converted by said conversion unit, to create a 3D video from the 2D video.

4. The three-dimensional video creating device according to claim 1,
wherein said selection unit is configured to select, from among the frames constituting the 2D video, frames captured for the same scene as the target frame, as the candidate three-dimensional partner frames.

5. The three-dimensional video creating device according to claim 4,
wherein, when each of a proportion of the common area to the target frame and a proportion of each of the common areas to a corresponding one of the candidate three-dimensional partner frames is greater than or equal to the predetermined value, said selection unit is configured to determine that the corresponding candidate three-dimensional partner frame is a frame captured for the same scene as the target frame, and
each of the common areas is calculated based on corresponding feature points among feature points on the target frame and feature points on each of the candidate three-dimensional partner frames.

6. The three-dimensional video creating device according to claim 4,
wherein said selection unit is configured to select, from among the frames constituting the 2D video, adjacent frames temporally close to the target frame, as the candidate three-dimensional partner frames.

7. The three-dimensional video creating device according to claim 1,
wherein the predetermined criteria include a vertical difference criterion, a horizontal parallax criterion, a smoothing criterion, and a distortion reduction criterion,
the vertical difference criterion specifies that the three-dimensional partner frame is a frame whose difference in vertical position between the common area in the target frame and the common area in the three-dimensional partner frame is substantially zero,
the horizontal parallax criterion specifies that the three-dimensional partner frame is a frame whose difference in horizontal position between the common area in the target frame and the common area in the three-dimensional partner frame is within a predetermined range,
the smoothing criterion specifies that the three-dimensional partner frame is a frame for which displacement of a common area between temporally successive three-dimensional pairs is smoothed, and
the distortion reduction criterion specifies that the three-dimensional partner frame is a frame which has a common area whose proportion to the respective frames is greater than or equal to the predetermined value in the same manner as the target frame.

8. The three-dimensional video creating device according to claim 7,
wherein said determination unit is configured to determine the three-dimensional partner frame by judging whether or not each of the candidate three-dimensional partner frames satisfies the predetermined criteria using feature points on a frame which become detectable by performing image processing.

9. The three-dimensional video creating device according to claim 1,
wherein said conversion unit is configured to generate the transformation matrix based on corresponding feature points among feature points on the target frame and feature points on the three-dimensional partner frame.

10. The three-dimensional video creating device according to claim 1,
wherein said conversion unit is configured to:
calculate a fundamental matrix using the target frame and the candidate three-dimensional partner frames;
calculate the skew transformation matrix based on the fundamental matrix so that a vertical difference between the target frame and each of the candidate three-dimensional partner frames in the three-dimensional pair is minimized;
calculate the projective transformation matrix so that the common area in the three-dimensional partner frame converted using the projective transformation matrix maintains the same orthogonality and aspect ratio as the common area in the three-dimensional partner frame before the conversion; and calculate the translation transformation matrix so that a parallax between the target frame and the three-dimensional partner frame to which the projective transformation matrix and the skew transformation matrix are applied becomes the same as a parallax between a target frame prior to the target frame and a three-dimensional partner frame; and generate the transformation matrix by combining the projective transformation matrix, the skew transformation matrix, and the translation transformation matrix that are calculated, and apply the transformation matrix to the three-dimensional pair.

11. The three-dimensional video creating device according to claim 2, wherein said stabilization unit is configured to correct the fluctuation between the one frame and the other frame, by using a projective transformation matrix calculated based on corresponding feature points among feature points on a predetermined frame and feature points on each of adjacent frames temporally close to the predetermined frame.

12. The three-dimensional video creating device according to claim 2, wherein said stabilization unit includes:

a detection unit configured to detect corresponding feature points among feature points on a predetermined frame and feature points on each of adjacent frames adjacent to the predetermined frame; and a calculation unit configured to calculate a projective transformation matrix for warping the predetermined frame so that the feature points on the predetermined frame and the weighted feature points on a corresponding one of the adjacent frames have the same coordinate value, and said stabilization unit is configured to stabilize the frames constituting the 2D video, by applying the projective transformation matrix to the predetermined frame.

13. The three-dimensional video creating device according to claim 12, wherein the adjacent frames are temporally close to the predetermined frame.

14. The three-dimensional video creating device according to claim 12, wherein said calculation unit is configured to: calculate a weight for each of the adjacent frames using a weight function; and when the corresponding adjacent frame is temporally closest to the predetermined frame, calculate a weighted value closer to 1 using the weight function, and when the corresponding adjacent frame is temporally far from the predetermined frame, calculate a weighted value smaller than 1 using the weight function.

15. The three-dimensional video creating device according to claim 2, wherein said receiving unit is configured to receive a 2D video captured by a user operating an image capturing apparatus, and said three-dimensional video creating device further comprising:

an analysis unit configured to analyze motion of the image capturing apparatus to generate information for guiding the user to capture a stable 2D video;

a feedback unit configured to generate feedback information for giving a feedback to the user, based on the information generated by said analysis unit; and a display unit configured to display the generated feedback information and the 2D video.

16. A three-dimensional video creating method for creating a three-dimensional (3D) video from a two-dimensional (2D) video, said three-dimensional video creating method comprising:

receiving a 2D video;

selecting, from among frames constituting the 2D video, frames each of which has a common area whose proportion to the frame is greater than or equal to a predetermined value, as candidate three-dimensional partner frames that are candidate frames each constituting a three-dimensional image together with a target frame included in the frames constituting the 2D video, each of the common areas being an area of an image common to the target frame;

determining, from among the candidate three-dimensional partner frames, a three-dimensional partner frame that is a frame which, together with the target frame, constitutes a three-dimensional image, based on predetermined criteria;

creating a three-dimensional pair constituting the three-dimensional image corresponding to the target frame, using the target frame and the three-dimensional partner frame; and generating, from the target frame and the candidate three-dimensional partner frames selected in said selecting, a transformation matrix for warping the candidate three-dimensional partner frames, and converting the three-dimensional pair by applying the generated transformation matrix to the three-dimensional pair.

* * * * *